US012647159B2

(12) United States Patent
Li et al.

(10) Patent No.: US 12,647,159 B2
(45) Date of Patent: Jun. 2, 2026

(54) PRECODING MATRIX INDICATOR FEEDBACK METHOD AND COMMUNICATION APPARATUS

(71) Applicant: Huawei Technologies Co., Ltd., Shenzhen (CN)

(72) Inventors: Shengyu Li, Beijing (CN); Lei Guan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 212 days.

(21) Appl. No.: 18/432,796

(22) Filed: Feb. 5, 2024

(65) Prior Publication Data

US 2024/0204834 A1 Jun. 20, 2024

Related U.S. Application Data

(63) Continuation of application No. PCT/CN2022/103986, filed on Jul. 5, 2022.

(30) Foreign Application Priority Data

Aug. 6, 2021 (CN) ......................... 202110904275.8

(51) Int. Cl.
*H04B 7/0456* (2017.01)

(52) U.S. Cl.
CPC ......... *H04B 7/0469* (2013.01); *H04B 7/0479* (2023.05); *H04B 7/048* (2023.05)

(58) Field of Classification Search
CPC ................ H04B 7/0469; H04B 7/0478; H04B 7/0479; H04B 7/0691; H04B 7/048
See application file for complete search history.

(56) References Cited

U.S. PATENT DOCUMENTS 10,270,501 B2 * 4/2019 Nagata ................. H04B 7/0456
10,439,690 B2 * 10/2019 Rahman ............... H04B 7/0469
(Continued)

FOREIGN PATENT DOCUMENTS

WO 2019196886 A1 10/2019

*Primary Examiner* — Betsy Deppe
(74) *Attorney, Agent, or Firm* — Slater Matsil, LLP

(57) ABSTRACT

This application provides a precoding matrix indicator feedback method and a communication apparatus, and relates to the field of communication technologies. The method is applied to a precoding process, and specifically includes: a terminal that first determines a first PMI, and then sends the first PMI to an access network device. The first PMI indicates a precoding matrix W. The precoding matrix W includes R precoding vectors $w_i$, where i=0,1,2, . . . , R−1. Each precoding vector $w_i$ is a column vector with a length of $N_1 \times N_2 \times N_g$. $N_g$ represents a quantity of antenna panels. $N_1$ represents a quantity of ports in a first dimension on one antenna panel. $N_2$ represents a quantity of ports in a second dimension on the antenna panel. $N_1$, $N_2$ and $N_g$ are all positive integers, and at least one of $N_1$, $N_2$, and $N_g$ is greater than or equal to 2.

20 Claims, 3 Drawing Sheets

(56) References Cited

U.S. PATENT DOCUMENTS

| | | | | |
|---|---|---|---|---|
| 10,819,406 | B2 * | 10/2020 | Huang ................. | H04B 7/0479 |
| 11,038,566 | B2 * | 6/2021 | Faxér ................... | H04B 7/0469 |

* cited by examiner

200

Terminal | Access network device

S204: First configuration information, where the first configuration information indicates that a quantity of ports of an RS is $N_1 \times N_2 \times N_g$ S205: First indication information, where the first indication information indicates a single-polarized PMI feedback manner, and the single-polarized PMI feedback manner indicated by the first indication information is used to determine the first PMI S206: Second indication information, where the second indication information indicates a polarization direction, and the polarization direction indicated by the second indication information is used to determine the first PMI S201: Determine a first PMI, where the first PMI indicates a precoding matrix W, the precoding matrix W includes R precoding vectors, and each precoding vector is a column vector with a length of $N_1 \times N_2 \times N_g$ S202: First PMI S203: Perform precoding based on the precoding matrix W indicated by the first PMI

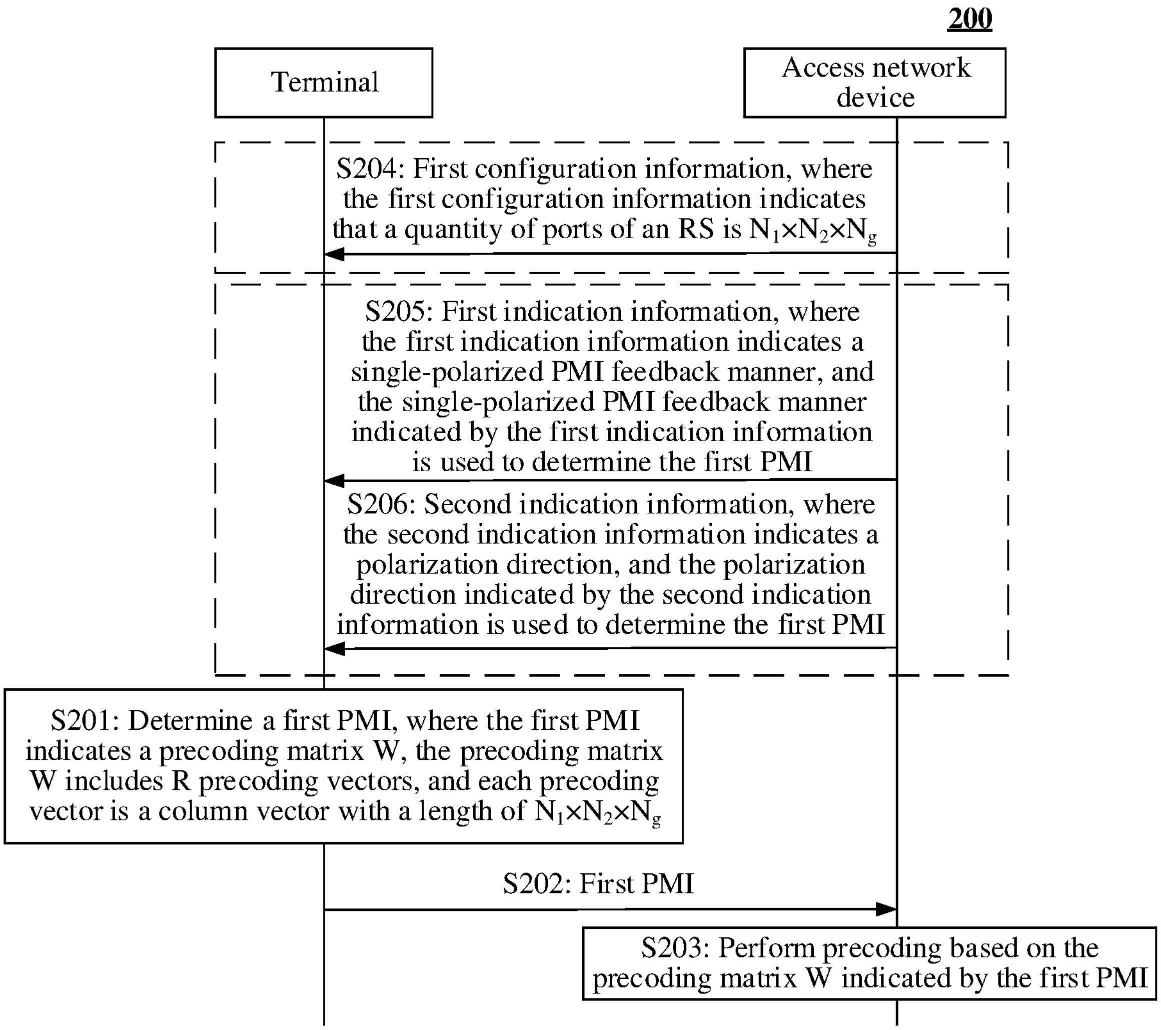

FIG. 2

Communication apparatus 300

Processing unit 310

Transceiver unit 320

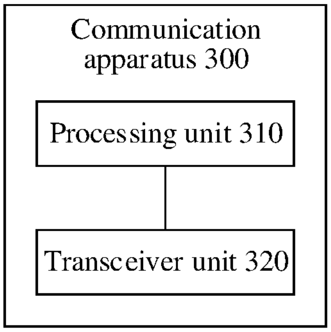

FIG. 3

PRECODING MATRIX INDICATOR FEEDBACK METHOD AND COMMUNICATION APPARATUS

CROSS-REFERENCE TO RELATED APPLICATIONS

This application is a continuation of International Application No. PCT/CN2022/103986, filed on Jul. 5, 2022, which claims priority to Chinese Patent Application No. 202110904275.8, filed on Aug. 6, 2021. The disclosures of the aforementioned applications are hereby incorporated by reference in their entireties.

TECHNICAL FIELD

This application relates to the field of wireless communication technologies, and in particular, to a precoding matrix indicator feedback method and a communication apparatus.

BACKGROUND

In a massive multiple-input multiple-output (Massive MIMO) system, a terminal and an access network device share one codebook. For downlink data transmission, the terminal first determines wireless channel information and interference information through channel estimation, selects a precoding matrix from the codebook based on the wireless channel information and the interference information, and feeds back a precoding matrix indicator (PMI) that corresponds to the precoding matrix and a corresponding channel quality indicator (CQI) to the access network device. The access network device restores the precoding matrix based on the PMI and the codebook, performs precoding processing based on a restored precoding matrix, and selects a modulation order and a coding rate of downlink data based on the CQI that is fed back. Therefore, system transmission performance is improved.

SUMMARY

This application provides a precoding matrix indicator feedback method and a communication apparatus, so that a PMI that matches a single-polarized antenna array can be fed back.

To achieve the foregoing objective, the following technical solutions are used in embodiments of this application.

According to a first aspect, a precoding matrix indicator feedback method is provided. A terminal determines a first precoding matrix indicator PMI. The first PMI indicates a precoding matrix W. The precoding matrix W includes R precoding vectors $w_i$, where i=0,1,2, . . . , R−1. The precoding vector $w_i$ is a column vector with a length of $N_1 \times N_2 \times N_g$. $N_g$ represents a quantity of antenna panels. $N_1$ represents a quantity of ports in a first dimension on one antenna panel. $N_2$ represents a quantity of ports in a second dimension on the antenna panel. $N_1$, $N_2$, and $N_g$ are all positive integers, and at least one of $N_1$, $N_2$, and $N_g$ is greater than or equal to 2. Then, the terminal sends the first PMI to an access network device. Correspondingly, the access network device receives the first PMI from the terminal.

In the precoding matrix indicator feedback method in this embodiment of this application, the precoding matrix W indicated by the first PMI includes the R precoding vectors $w_i$, and the precoding vector $w_i$ is the column vector with the length of $N_1 \times N_2 \times N_g$. In other words, the precoding matrix W indicated by the first PMI includes a precoding vector in a polarization direction, and matches an antenna array in a single-polarized design. In this way, the terminal can feed back, to the access network device, the first PMI that matches the single-polarized antenna array.

In a possible design, the access network device sends first configuration information to the terminal. Correspondingly, the terminal receives the first configuration information. The first configuration information indicates that a quantity of ports of a reference signal RS is $N_1 \times N_2 \times N_g$. A measurement result of the RS is used to determine the first PMI.

When the access network device determines that the antenna array is deployed in a single-polarized manner, to reduce reference signal overheads, the quantity of ports of the reference signal usually sent by the access network device corresponds to a quantity of ports in a polarization direction, that is, the quantity is $N_1 \times N_2 \times N_g$. In this case, the terminal can determine, based on the reference signal, an antenna port in only one polarization direction. If the terminal feeds back a PMI based on an existing dual-polarized codebook and an assumption that the antenna array is deployed in a dual-polarized manner, a precoding matrix that is fed back may not match a channel feature of the antenna port in the actual antenna array deployed in the single-polarized manner, and feedback accuracy is reduced. In this embodiment of this application, the terminal determines, based on the quantity of ports of the RS and an antenna array configuration manner, that the antenna array is deployed in the single-polarized manner. In this way, the precoding matrix indicated by the first PMI that is fed back by the terminal is quantized based on the channel feature in deployment of the single-polarized antenna array, to improve the feedback accuracy.

In a possible design, the access network device sends first indication information to the terminal. Correspondingly, the terminal receives the first indication information. The first indication information indicates a single-polarized PMI feedback manner, and the single-polarized PMI feedback manner is used to determine the first PMI.

For example, when sending the reference signal, the access network device still correspondingly sends a reference signal for all ports in deployment of a dual-polarized antenna array. Then, the access network device indicates, based on the first indication information, that the terminal feeds back a single-polarized precoding matrix. In other words, the first indication information indicates that the terminal uses the single-polarized PMI feedback manner to determine the first PMI. In this case, if the terminal still feeds back a PMI that indicates a dual-polarized precoding matrix, that is, a quantity of ports of the precoding matrix indicated by the PMI that is fed back is $2 \times N_1 \times N_2 \times N_g$, offset value information between two polarization directions needs to be additionally fed back. Consequently, the feedback overheads are increased. However, in this embodiment of this application, when the terminal feeds back the first PMI, the terminal determines, based on the first indication information, that the single-polarized PMI feedback manner is used to determine the first PMI, that is, the PMI that indicates the single-polarized precoding matrix needs to be fed back. In this way, the precoding matrix indicated by the first PMI that is fed back by the terminal is fed back based on a channel feature in a polarization direction of the port of the reference signal, to reduce quantization overheads and the feedback overheads.

In a possible design, the access network device sends second indication information to the terminal. Correspondingly, the terminal receives the second indication information. The second indication information indicates a polarization direction, and the polarization direction is used to determine the first PMI. The terminal may determine a polarization direction based on the second indication information from the access network device, where precoding matrix quantization is performed on the first PMI based on a measurement channel feature of a port in the polarization direction in a reference signal. Therefore, it is ensured that the precoding matrix indicated by the first PMI matches the port that is in the polarization direction and that is expected by the access network device for using, and transmission efficiency is improved.

In a possible design, $N_g=1$. The precoding vector $w_i$ is a two-dimensional discrete Fourier transform DFT vector. The two-dimensional DFT vector satisfies:

$$\begin{cases} v_{l_i,m_i} = \left[u_{m_i},\ u_{m_i}e^{j\frac{2\pi l_i}{O_1N_1}},\ \ldots,\ u_{m_i}e^{j\frac{2\pi l_i(N_1-1)}{O_1N_1}}\right]^T \\ u_{m_i} = \left[1,\ e^{j\frac{2\pi m_i}{O_2N_2}},\ \ldots,\ e^{j\frac{2\pi m_i(N_2-1)}{O_2N_2}}\right] \end{cases}$$

$v_{l_i,m_i}$ represents a two-dimensional DFT vector. $(l_i, m_i)$ respectively represents an index of the two-dimensional DFT vector in the first dimension and an index of the two-dimensional DFT vector in the second dimension, $l_i=0, 1, \ldots, O_1N_1-1$, and $m_i=0, 1, \ldots, O_2N_2-1$. $O_1$ represents an oversampling factor in the first dimension. $O_2$ represents an oversampling factor in the second dimension. The first PMI is used to determine $(l_i, m_i)$.

In a possible design, $N_g>1$. The precoding vector $w_i$ satisfies:

$$w_i=[w_{i,0};\ w_{i,1};\ \ldots;\ w_{i,N_g-1}]$$

The sub-vector $w_{i,0}$ is the $1^{st}$ sub-vector in the precoding vector $w_i$. The sub-vector $w_{i,0}$ is a two-dimensional DFT vector, and the two-dimensional DFT vector satisfies:

$$\begin{cases} v_{l_i,m_i} = \left[u_{m_i},\ u_{m_i}e^{j\frac{2\pi l_i}{O_1N_1}},\ \ldots,\ u_{m_i}e^{j\frac{2\pi l_i(N_1-1)}{O_1N_1}}\right]^T \\ u_{m_i} = \left[1,\ e^{j\frac{2\pi m_i}{O_2N_2}},\ \ldots,\ e^{j\frac{2\pi m_i(N_2-1)}{O_2N_2}}\right] \end{cases}$$

$v_{l_i,m_i}$ represents the two-dimensional DFT vector. $(l_i, m_i)$ respectively represents an index of the two-dimensional DFT vector in the first dimension and an index of the two-dimensional DFT vector in the second dimension, $l_i=0, 1, \ldots, O_1N_1-1$, and $m_i=0, 1, \ldots, O_2N_2-1$. $O_1$ represents an oversampling factor in the first dimension. $O_2$ represents an oversampling factor in the second dimension.

The sub-vector $w_{i,g}$ is the $(g+1)^{th}$ sub-vector in the precoding vector $w_i$, and the sub-vector $w_{i,g}$ satisfies:

$$w_{i,g}=\alpha_g w_{i,0}$$

$g=1, 2, \ldots, N_g-1$. $\alpha_g$ is an offset value of the $(g+1)^{th}$ sub-vector $w_{i,g}$ relative to the $1^{st}$ sub-vector $w_{i,0}$.

The first PMI is used to determine $(l_i, m_i)$ and the offset value $\alpha_g$.

In other words, in a Type-1 single panel codebook and a Type-1 multi-panel codebook, the precoding matrix W indicated by the first PMI includes the precoding vector in the polarization direction. In comparison with a Type-1 codebook that matches the dual-polarized antenna array, the precoding matrix W indicated by the first PMI does not include a precoding vector in another polarization direction. Therefore, the feedback overheads can be reduced. In addition, the precoding matrix indicated by the first PMI is quantized and fed back based on the deployment of the single-polarized antenna array. In comparison with feedback accuracy in a case in which a dual-polarized codebook is fed back based on an antenna array that is deployed in the dual-polarized manner and that has a same quantity of ports, the feedback accuracy of embodiments of this application is higher.

In a possible design, the precoding vector wa is a linear weight of S two-dimensional DFT vectors. The precoding vector $w_i$ satisfies:

$$w_i = \sum_{s=0}^{S-1} \beta_{i,s} v_{l_s,m_s}$$

$\beta_{i,s}$ is a combination coefficient of the precoding vector $w_i$ on the S two-dimensional DFT vectors. $v_{l_s,m_s}$ represents the $(s+1)^{th}$ two-dimensional DFT vector in the S two-dimensional DFT vectors, and the $(s+1)^{th}$ two-dimensional DFT vector $v_{l_s,m_s}$ satisfies:

$$\begin{cases} v_{l_s,m_s} = \left[u_{m_s},\ u_{m_s}e^{j\frac{2\pi l_s}{O_1N_1}},\ \ldots,\ u_{m_s}e^{j\frac{2\pi l_s(N_1-1)}{O_1N_1}}\right]^T \\ u_{m_s} = \left[1,\ e^{j\frac{2\pi m_s}{O_2N_2}},\ \ldots,\ e^{j\frac{2\pi m_s(N_2-1)}{O_2N_2}}\right] \end{cases}$$

$(l_s, m_s)$ respectively represents an index of the $(s+1)^{th}$ two-dimensional DFT vector in the first dimension and an index of the $(s+1)^{th}$ two-dimensional DFT vector in the second dimension, $l_s=0, 1, \ldots, O_1N_1-1$, and $m_s=0, 1, \ldots, O_2N_2-1$. $O_1$ represents an oversampling factor in the first dimension. $O_2$ represents an oversampling factor in the second dimension, and S is an integer of greater than or equal to 2. The first PMI is used to determine $(l_s, m_s)$ and the combination coefficient $\beta_{i,s}$.

In a possible design, the precoding vector $w_i$ is a linear weight of S unit vectors. The precoding vector $w_i$ satisfies:

$$w_i = \sum_{s=0}^{S-1} \beta_{i,s} v_{l_s}$$

$\beta_{i,s}$ is a combination coefficient of the precoding vector $w_i$ on the S unit vectors. $v_{l_s}$ is a column vector with a length of $N_1 \times N_2$, where the $(l_s+1)^{th}$ element is 1, and other elements are 0. $l_s$ represents an index of $v_{l_s}$, and $l_s=0, 1, \ldots, S-1$. S is an integer greater than or equal to 2. The first PMI is used to determine the index $l_s$ and the combination coefficient $\beta_{i,s}$.

In a process of determining a Type-2 codebook of a dual-polarized antenna array or a Type-2 port selection codebook of a dual-polarized antenna array, indexes of S base vectors and a combination coefficient of precoding vectors corresponding to ports in two polarization directions need to be first determined. However, in embodiments of this application, only the indexes $l_s$ of the S base vectors and the combination coefficient $\beta_{i,s}$ of the precoding vector that corresponds to a port in one polarization direction need to be determined for determining the first PMI. Therefore, implementation complexity and processing load of the terminal are reduced.

In a possible design, the first PMI is carried in a first CSI report, and the first CSI report does not include a second PMI. The second PMI and the first PMI jointly indicate a precoding matrix $W_{dual}$. The precoding matrix $W_{dual}$ includes R precoding vectors $w_{dual,i}$, $w_{dual,i}=[w_i, \tilde{w}_i]$, and $i=0,1,2, \ldots, R-1$. The precoding vectors $w_i$ and $\tilde{w}_i$ are column vectors with a length of $N_1 \times N_2 \times N_g$. The precoding vector wi represents a precoding vector in a first polarization direction. The precoding vector $\tilde{w}_i$ represents a precoding vector in a second polarization direction.

In other words, the first PMI indicates a precoding matrix in a polarization direction.

In a possible design, the first PMI is carried in a first CSI report. The first PMI is a single-polarized PMI. The first CSI report further includes a third PMI. The third PMI is a dual-polarized PMI. The third PMI indicates a precoding matrix $$W'_{dual}.$$

The precoding matrix $$W'_{dual}$$

includes $$R'_{dual}$$

precoding vectors $$w'_{dual,i},$$

and $$i = 0, 1, 2, \ldots, R'_{dual} - 1.$$

The precoding vector $$w'_{dual},$$

$_i$ is a column vector with a length of $2 \times N_1 \times N_2 \times N_g$.

In other words, when the access network device expects to obtain both the precoding matrix in the deployment of the single-polarized antenna array and the precoding matrix in the deployment of the dual-polarized antenna array, the access network device may indicate to report a plurality of pieces of CSI in one CSI report. Different CSI corresponds to different antenna array deployment manners. The configuration manner can enable two pieces of CSI to share a downlink reference signal, and reduce pilot overheads of the downlink reference signal.

In a possible design, the first PMI is carried on an uplink physical channel, for example, a physical uplink control channel PUCCH or a physical uplink shared channel PUSCH.

According to a second aspect, a communication apparatus is provided. The communication apparatus may be a terminal in any one of the first aspect or the possible designs of the first aspect, or a chip that implements a function of the terminal. The communication apparatus includes a corresponding module, a unit, or a means that implements the method. The module, the unit, or the means may be implemented by hardware, software, or hardware executing corresponding software. The hardware or the software includes one or more modules or units corresponding to the foregoing functions.

The communication apparatus includes a processing unit and a transceiver unit. The processing unit is configured to determine a first precoding matrix indicator PMI. The first PMI indicates a precoding matrix W. The precoding matrix W includes R precoding vectors $w_i$, where $i=0,1,2, \ldots, R-1$. The precoding vector $w_i$ is a column vector with a length of $N_1 \times N_2 \times N_g$. $N_g$ represents a quantity of antenna panels. $N_1$ represents a quantity of ports in a first dimension on one antenna panel. $N_2$ represents a quantity of ports in a second dimension on the antenna panel. $N_1$, $N_2$, and $N_g$ are all positive integers, and at least one of $N_1$, $N_2$, and $N_g$ is greater than or equal to 2. The transceiver unit is configured to send the first PMI.

In a possible design, the transceiver unit is further configured to receive first configuration information. The first configuration information indicates that a quantity of ports of a reference signal RS is $N_1 \times N_2 \times N_g$, and a measurement result of the RS is used to determine the first PMI.

In a possible design, the transceiver unit is further configured to receive first indication information. The first indication information indicates a single-polarized PMI feedback manner, and the single-polarized PMI feedback manner is used to determine the first PMI.

In a possible design, the transceiver unit is further configured to receive second configuration information. The second indication information indicates a polarization direction, and the polarization direction indicated by the second indication information is used to determine the first PMI.

For a more detailed design of the communication apparatus, refer to related descriptions in the first aspect.

According to a third aspect, a communication apparatus is provided. The communication apparatus may be an access network device in any one of the first aspect or the possible designs of the first aspect, or a chip that implements a function of the access network device. The communication apparatus includes a corresponding module, a unit, or a means that implements the method. The module, the unit, or the means may be implemented by hardware, software, or hardware executing corresponding software. The hardware or the software includes one or more modules or units corresponding to the foregoing functions.

The communication apparatus includes a processing unit and a transceiver unit. The transceiver unit is configured to receive a first precoding matrix indicator PMI. The first PMI indicates a precoding matrix W. The precoding matrix W includes R precoding vectors $w_i$, where $i=0,1,2, \ldots, R-1$. The precoding vector $w_i$ is a column vector with a length of $N_1 \times N_2 \times N_g$. $N_g$ represents a quantity of antenna panels. $N_1$ represents a quantity of ports in a first dimension on one antenna panel. $N_2$ represents a quantity of ports in a second dimension on the antenna panel. $N_1$, $N_2$, and $N_g$ are all positive integers, and at least one of $N_1$, $N_2$, and $N_g$ is greater than or equal to 2. The processing unit is configured to perform precoding based on the precoding matrix W indicated by the first PMI.

In a possible design, the transceiver unit is further configured to send first configuration information. The first configuration information indicates that a quantity of ports of a reference signal RS is $N_1 \times N_2 \times N_g$, and a measurement result of the RS is used to determine the first PMI.

In a possible design, the transceiver unit is further configured to send first indication information. The first indication information indicates a single-polarized PMI feedback manner, and the single-polarized PMI feedback manner is used to determine the first PMI.

In a possible design, the transceiver unit is further configured to send second configuration information. The second indication information indicates a polarization direction, and the polarization direction indicated by the second indication information is used to determine the first PMI.

For a more detailed design of the communication apparatus, refer to related descriptions in the first aspect.

According to a fourth aspect, a communication apparatus is provided, including a processor and a memory. The memory is configured to store computer instructions. When the processor executes the instructions, the communication apparatus is enabled to perform the method that is performed by a terminal in any one of the foregoing aspects or any possible design of the foregoing aspects. The communication apparatus may be a terminal in any one of the first aspect or the possible designs of the first aspect, or a chip that implements a function of the terminal. The communication apparatus may alternatively be an access network device in any one of the first aspect or the possible designs of the first aspect, or a chip that implements a function of the access network device.

According to a fifth aspect, a communication apparatus is provided, including a processor. The processor is coupled to a memory, and is configured to read and execute instructions in the memory, so that the communication apparatus performs a method that is performed by a terminal in any one of the foregoing aspects or any possible design of the foregoing aspects. The communication apparatus may be a terminal in any one of the first aspect or the possible designs of the first aspect, or a chip that implements a function of the terminal. The communication apparatus may alternatively be an access network device in any one of the first aspect or the possible designs of the first aspect, or a chip that implements a function of the access network device.

According to a sixth aspect, a chip is provided, including a processing circuit and an input/output interface. The input/output interface is configured to communicate with a module other than the chip. For example, the chip may be a chip that implements a function of a terminal in any one of the first aspect or the possible designs of the first aspect, or may be a chip that implements a function of an access network device in any one of the first aspect or the possible designs of the first aspect. The processing circuit is configured to run a computer program or instructions, to implement the method in any one of the first aspect or the possible designs of the first aspect.

According to a seventh aspect, a computer-readable storage medium is provided. The computer-readable storage medium stores instructions. When the instructions are executed by a communication apparatus, the communication apparatus can perform the method in any one of the foregoing aspects.

According to an eighth aspect, a computer program product whose type includes instructions is provided. When the computer program product is executed by a communication apparatus, the communication apparatus can perform the method in any one of the foregoing aspects.

According to a ninth aspect, a circuit system is provided. The circuit system includes a processing circuit, and the processing circuit is configured to perform the method in any one of the foregoing aspects.

According to the tenth aspect, a communication system is provided, and the communication system includes a terminal and an access network device in any one of the foregoing aspects.

For technical effects brought by any design of the second aspect to the tenth aspect, refer to beneficial effects brought by the foregoing corresponding methods. Details are not described herein again.

BRIEF DESCRIPTION OF THE DRAWINGS

FIG. 2 is a schematic flowchart of a precoding matrix indicator feedback method according to an embodiment of this application;

FIG. 3 is a schematic diagram of a structure of a communication apparatus according to an embodiment of this application.

DETAILED DESCRIPTION OF THE EMBODIMENTS

Figure 1:
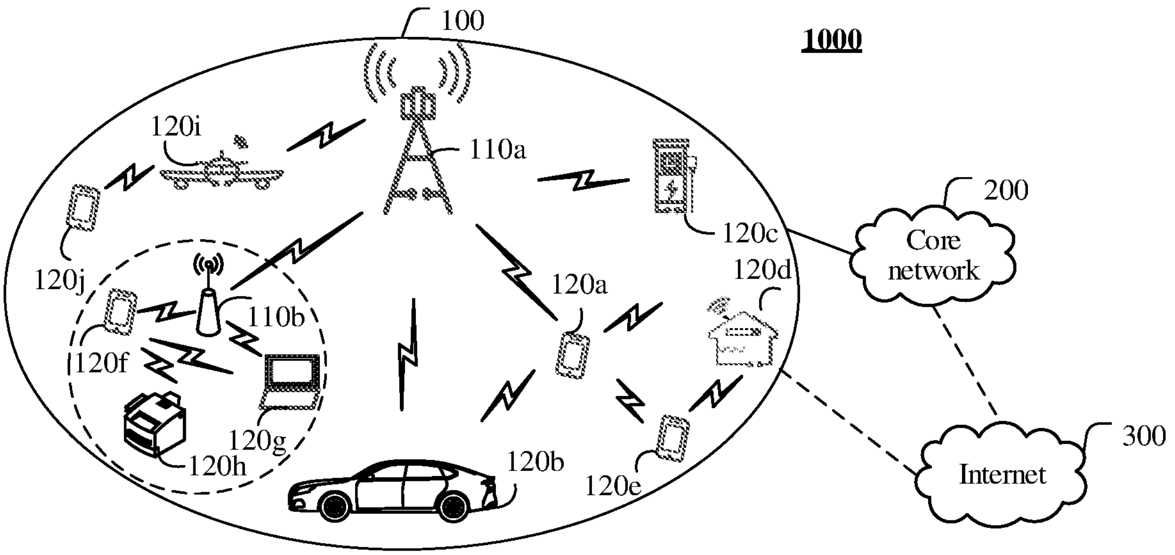
FIG. 1 is a schematic diagram of an architecture of a mobile communication system according to an embodiment of this application.

FIG. 1 is a schematic diagram of an architecture of a communication system 1000 to which an embodiment of this application is applied. As shown in FIG. 1, the communication system includes a radio access network 100 and a core network 200. Optionally, the communication system 1000 may further include an Internet 300. The radio access network 100 may include at least one radio access network device (for example, 110*a* and 110*b* in FIG. 1), and may further include at least one terminal (for example, 120*a* to 120*j* in FIG. 1). The terminal is connected to the radio access network device in a wireless manner, and the radio access network device is connected to the core network in a wireless or wired manner. A core network device and the radio access network device may be different physical devices independent of each other, functions of the core network device and logical functions of the radio access network device may be integrated into a same physical device, or a part of functions of the core network device and a part of functions of the radio access network device may be integrated into one physical device. A wired or wireless manner may be used for connection between terminals and between radio access network devices. FIG. 1 is only a schematic diagram. The communication system may further include another network device, for example, may further include a wireless relay device and a wireless backhaul device, which are not shown in FIG. 1.

The radio access network device may be a base station, an evolved NodeB (eNodeB), a transmission reception point (TRP), a next generation NodeB (gNB) in a $5^{th}$ generation (5G) mobile communication system, a next generation NodeB in a $6^{th}$ generation (6G) mobile communication system, a base station in a future mobile communication system, an access node in a Wi-Fi system, or the like; or may be a module or unit that completes some functions of the base station, for example, may be a central unit (CU), or may be a distributed unit (DU). The CU herein completes functions of the radio resource control protocol and the packet data convergence protocol (PDCP) of the base station, and may further complete functions of the service data adaptation protocol (SDAP). The DU completes functions of a radio link control layer and a medium access control (MAC) layer of the base station, and may further complete functions of a part or all of a physical layer. For specific descriptions of the foregoing protocol layers, reference may be made to technical specifications related to the 3rd generation partnership project (3GPP). The radio access network device may be a macro base station (for example, 110$a$ in FIG. 1), or may be a micro base station or an indoor station (for example, 110$b$ in FIG. 1), or may be a relay node, a donor node, or the like. A specific technology and a specific device form used by the radio access network device are not limited in embodiments of this application. In embodiments of this application, the radio access network device may be referred to as an access network device for short, and the base station is a specific example of the access network device.

The terminal may also be referred to as terminal equipment, user equipment (UE), a mobile station, a mobile terminal, or the like. The terminal may be widely used in various scenarios, for example, device-to-device (D2D), vehicle to everything (V2X) communication, machine-type communication (MTC), internet of things (IOT), virtual reality, augmented reality, industrial control, self-driving, telemedicine, smart grid, smart furniture, smart office, smart wearable, smart transportation, smart city, and the like. The terminal may be a mobile phone, a tablet computer, a computer with a wireless transceiver function, a wearable device, a vehicle, an uncrewed aerial vehicle, a helicopter, an airplane, a ship, a robot, a mechanical arm, a smart home device, or the like. A specific technology and a specific device form used by the terminal are not limited in embodiments of this application.

The base station and the terminal may be fixed or movable. The base station and the terminal may be deployed on land, including an indoor or outdoor scenario, and a handheld or an in-vehicle scenario; or may be deployed on water; or may be deployed on an aircraft, a balloon, or an artificial satellite in the air. Application scenarios of the base station and the terminal are not limited in embodiments of this application.

Roles of the base station and the terminal may be opposite, for example, the helicopter or uncrewed aerial vehicle 120$i$ in FIG. 1 may be configured as the mobile base station, and for the terminal 120$j$ accessing the radio access network 100 through 120$i$, the terminal 120$i$ is the base station. However, for the base station 110$a$, 120$i$ is the terminal, that is, communication between 110$a$ and 120$i$ is performed by using a wireless air interface protocol. Certainly, communication may also be performed between 110$a$ and 120$i$ by using an interface protocol between base stations. In this case, in comparison with 110$a$, 120$i$ is also the base station. Therefore, both the base station and the terminal may be collectively referred to as a communication apparatus, 110$a$ and 110$b$ in FIG. 1 may be referred to as a communication apparatus having a function of the base station, and 120$a$ to 120$j$ in FIG. 1 may be referred to as a communication apparatus having a function of the terminal.

Communication between the base station and the terminal, between the base station and the base station, or between the terminal and the terminal may be performed by using a licensed spectrum, or may be performed by using an unlicensed spectrum, or may be performed by using both the licensed spectrum and the unlicensed spectrum. Communication may be performed by using a spectrum below 6 gigahertz (GHz), or may be performed by using a spectrum above 6 GHz, or may be simultaneously performed by using the spectrum below 6 GHz and the spectrum above 6 GHz. A spectrum resource used for wireless communication is not limited in embodiments of this application.

In embodiments of this application, the function of the base station may be performed by a module (for example, a chip) in the base station, or may be performed by a control sub-system including the function of the base station. The control subsystem that includes the function of the base station herein may be a control center in the foregoing application scenarios, such as the smart grid, the industrial control, the intelligent transportation, and the smart city. The function of the terminal may be performed by a module (for example, a chip or a modem) in the terminal, or may be performed by an apparatus including the function of the terminal.

In this application, the base station sends a downlink signal or downlink information to the terminal, where the downlink information is carried on a downlink channel. The terminal sends an uplink signal or uplink information to the base station, where the uplink information is carried on an uplink channel. To communicate with the base station, the terminal needs to establish a wireless connection to a cell controlled by the base station. The cell that establishes the wireless connection to the terminal is referred to as a serving cell of the terminal. When communicating with the serving cell, the terminal is further interfered by a signal from a neighboring cell.

For ease of understanding embodiments of this application, the following first briefly describes terms in embodiments of this application. It should be understood that these descriptions are merely for ease of understanding embodiments of this application, and shall not constitute any limitation on this application.

1. Antenna Port

The antenna port is a logical concept. One antenna port corresponds to one or more antenna elements. Each antenna port may correspond to one reference signal (RS). Therefore, each antenna port may be referred to as a reference signal port.

2. Precoding Technology

The precoding technology means that a sending device (for example, an access network device) can process, when a channel state is known, a to-be-sent signal by using a precoding matrix that matches a channel condition, so that the to-be-sent signal that is pre-coded adapts to a channel. Therefore, a receiving device (for example, a terminal) can eliminate inter-channel interference by using corresponding equalization reception, and transmission performance is improved. Therefore, precoding processing is performed on the to-be-sent signal, to improve received signal quality. The signal quality herein may be a signal to interference plus noise ratio (SINR).

3. Precoding Matrix and Precoding Matrix Indicator (PMI)

The PMI may indicate the precoding matrix. For example, the precoding matrix may be obtained by performing singular value decomposition (SVD) on a channel matrix or a covariance matrix of a channel matrix. Alternatively, the precoding matrix may be obtained by performing eigenvalue decomposition (EVD) on the covariance matrix of the channel matrix. The channel matrix may be determined by a terminal through channel estimation and then reported to an access network device, or determined by an access network device based on channel reciprocity.

The PMI includes a single-polarized PMI and a dual-polarized PMI. The single-polarized PMI is a precoding matrix indicator in which quantization and a feedback is performed based on a channel feature in deployment of a single-polarized antenna array. A quantity of ports corresponding to a precoding matrix indicated by the single-polarized PMI is equal to a quantity of ports in the single-polarized antenna array. In embodiments of this application, a first PMI is used as an example to describe the single-polarized PMI. The dual-polarized PMI is a precoding matrix indicator in which quantization and a feedback is performed based on a channel feature in deployment of a dual-polarized antenna array. A quantity of ports corresponding to a precoding matrix indicated by the dual-polarized PMI is equal to a quantity of ports in the dual-polarized antenna array. Based on a current $5^{th}$ generation mobile communication technology new radio (5G NR) protocol, in the precoding matrix corresponding to the dual-polarized PMI, a precoding vector of each transmission stream generally includes two sub-vectors. The two sub-vectors respectively correspond to sub-vectors of the transport stream in two polarization directions. A precoding matrix formed by grouping sub-vectors of all transport streams in each polarization direction may be considered as a single-polarized PMI, and has a same dimension and a composition form as the precoding matrix corresponding to the foregoing single-polarized PMI. In embodiments of this application, a third PMI is used as an example to describe the dual-polarized PMI.

4. Channel State Information (CSI) and Channel State Information Report (CSI Report)

In a wireless communication system, the CSI is measured and calculated by a receiving device (such as a terminal). The CSI is a transmission parameter recommended by the receiving device to be used by a sending device, and indicates wireless channel information and interference information from the sending device (such as an access network device) to the receiving device. One piece of CSI may include at least one of a PMI, a rank indication (RI), a CQI, a channel state information reference signal (CSI-RS), and a resource indication.

A CSI report may include one piece of CSI, or may include a plurality of pieces of CSI. In other words, the receiving device may report one piece of CSI or a plurality of pieces of CSI to the sending device by using one CSI report. Different CSI may indicate wireless channel information and interference information on different frequency domain resources, or may indicate different solutions in which the sending device processes a signal. For example, different analog transmit beams may be indicated, or different coordinated scheduling modes between a plurality of sending devices may be indicated, or different antenna shutdown modes may be indicated. For example, one CSI report includes a plurality of pieces of CSI. Each piece of CSI includes a corresponding group of RIs, PMIs, or CQIs, respectively indicating a recommended quantity of transport streams, a recommended precoding vector, or recommended channel quality in an antenna shutdown pattern. Two different antenna shutdown patterns mean that index sets of two shutdown antenna ports in the two antenna shutdown patterns are different.

5. Codebook

The codebook is a set of precoding matrices. The codebook usually matches a dual-polarized antenna port. In embodiments of this application, dual-polarized directions are denoted as a polarization direction A and a polarization direction B. The following describes six types of codebooks.

For ease of understanding and description, the following describes main parameters involved in this application:

Ng: indicates a quantity of antenna panels.

$N_1$: indicates a quantity of antenna ports in a first dimension on an antenna panel, where the first dimension may be a horizontal dimension, and the horizontal dimension may be denoted as an H dimension.

$N_2$: indicates a quantity of antenna ports in a second dimension on an antenna panel, where the second dimension may be a vertical dimension, and the vertical dimension may be denoted as a V dimension.

$O_1$: indicates an oversampling factor of the first dimension on an antenna panel.

$O_2$: indicates an oversampling factor of the second dimension on an antenna panel.

R: indicates a quantity of transmission streams, where R is a positive integer. In embodiments of this application, a specific transport stream in the R transport streams may be described as the $(r+1)^{th}$ transport stream, where $0 \le r \le R-1$.

$M_r$: indicates a quantity of frequency domain base vectors of the $(r+1)^{th}$ transport stream. In embodiments of this application, a specific base vector in the $M_r$ frequency domain base vectors may be described the $(f+1)^{th}$ base vector, where $0 \le f \le M_r-1$.

L: indicates a quantity of space domain base vectors. In embodiments of this application, a specific base vector in the L space domain base vectors may be described as the $(l+1)^{th}$ base vector, where $0 \le l \le L-1$.

$P_{CSI-RS}$: indicates a quantity of CSI-RS antenna ports.

e represents a natural constant, j represents a unit imaginary number, π represents a circumference, and $\lceil\ \rceil$ represents a rounding-up operator.

In a Type-1 single panel codebook, a codebook mode is used to determine a specific codebook. Specifically, the codebook mode can be used to determine whether a parameter is fed back by using a wideband or fed back by using a subband. In a Type-1 multi-panel codebook, a codebook mode indicates a selection manner of phase rotation factors between antenna panels. For example, in a codebook mode 1, phase rotation factors between two antenna panels are wideband factors. In other words, there are same phase rotation factors between two antenna panels on all subbands. In a codebook mode 2, phase rotation factors between two antenna panels are subband factors. In other words, there may be different phase rotation factors between two antenna panels on different subbands. The codebook mode 1 may be denoted as codebook mode=1. The codebook mode 2 may be denoted as codebook mode=2. In addition, codebook mode=1-2 indicates the codebook mode 1 and the codebook mode 2. It should be understood that, when codebook modes are different, manners in which parameters (for example, $i_1$ and $i_2$) in a PMI are mapped to codebook parameters (for example, l, m and n) may also be different.

It should be noted that, when there are a plurality of antenna panels, values of $N_1$ (or values of $N_2$, or values of $O_1$, or values of $O_2$) on different antenna panels may be the same, or may be different. Embodiments of this application is described by using an example in which the values of $N_1$ (or the values of $N_2$, or the values of $O_1$, or the values of $O_2$) on different antenna panels are the same.

(1) The Type-1 single panel codebook is described as follows:

When a quantity of ports is equal to 2, differentiation between a single-polarized antenna port and a dual-polarized antenna port is not required for the codebook.

When the quantity of ports is greater than or equal to 4 (for example, 4, 8, 12, 16, 24, or 32), the codebook is constructed by using $i_1$ and $i_2$. $i_1$ is used to determine precoding matrices $W_A=[W_{A,1}, \ldots, W_{A,R}]$ of all ports in a single-polarized direction (for example, the polarization direction A). $W_A$ is a matrix formed by two-dimensional discrete Fourier transform (DFT) vectors. A value of $i_1$ satisfies the following formula:

$$i_1 = \begin{cases} [i_{1,1} \quad i_{1,2}] & R \notin \{2, 3, 4\} \\ [i_{1,1} \quad i_{1,2} \quad i_{1,3}] & R \in \{2, 3, 4\} \end{cases} \qquad \text{Formula (1-1)}$$

$i_2$ is used to determine a precoding matrix $W_B=[W_{B,1}, \ldots, W_{B,R}]$ in another polarization direction (for example, a polarization direction B). Specifically, $i_2$ determines a phase rotation factor of a precoding vector $w_{B,r}$ that is in the polarization direction B and that is relative to a precoding vector $w_{A,r}$ of a same transport stream in the polarization direction A, to determine the precoding vector $w_{B,r}$ and the precoding matrix $W_B$ in the polarization direction B.

For example, a Type-1 single panel codebook is shown in Table 1-1.

TABLE 1-1

| Codebook mode = 2, $N_2 > 1$ | | | | | |
|---|---|---|---|---|---|
| $i_{1,1}$ | $i_{1,2}$ | $i_2$ | | | |
| | | 0 | 1 | 2 | 3 |
| $0, 1, \ldots, \frac{N_1O_1}{2}-1$ | $0, 1, \ldots, \frac{N_2O_2}{2}-1$ | $W_{2i_{1,1},2i_{1,2},0}^{(1)}$ | $W_{2i_{1,1},2i_{1,2},1}^{(1)}$ | $W_{2i_{1,1},2i_{1,2},2}^{(1)}$ | $W_{2i_{1,1},2i_{1,2},3}^{(1)}$ |
| $i_{1,1}$ | $i_{1,2}$ | $i_2$ | | | |
| | | 4 | 5 | 6 | 7 |
| $0, 1, \ldots, \frac{N_1O_1}{2}-1$ | $0, 1, \ldots, \frac{N_2O_2}{2}-1$ | $W_{2i_{1,1}+1,2i_{1,2},0}^{(1)}$ | $W_{2i_{1,1}+1,2i_{1,2},1}^{(1)}$ | $W_{2i_{1,1}+1,2i_{1,2},2}^{(1)}$ | $W_{2i_{1,1}+1,2i_{1,2},3}^{(1)}$ |
| $i_{1,1}$ | $i_{1,2}$ | $i_2$ | | | |
| | | 8 | 9 | 10 | 11 |
| $0, 1, \ldots, \frac{N_1O_1}{2}-1$ | $0, 1, \ldots, \frac{N_2O_2}{2}-1$ | $W_{2i_{1,1},2i_{1,2}+1,0}^{(1)}$ | $W_{2i_{1,1},2i_{1,2}+1,1}^{(1)}$ | $W_{2i_{1,1},2i_{1,2}+1,2}^{(1)}$ | $W_{2i_{1,1},2i_{1,2}+1,3}^{(1)}$ |
| $i_{1,1}$ | $i_{1,2}$ | $i_2$ | | | |
| | | 12 | 13 | 14 | 15 |
| $0, 1, \ldots, \frac{N_1O_1}{2}-1$ | $0, 1, \ldots, \frac{N_2O_2}{2}-1$ | $W_{2i_{1,1}+1,2i_{1,2},+10}^{(1)}$ | $W_{2i_{1,1}+1,2i_{1,2},+11}^{(1)}$ | $W_{2i_{1,1}+1,2i_{1,2},+12}^{(1)}$ | $W_{2i_{1,1}+1,2i_{1,2},+13}^{(1)}$ |

$$W_{l,m,n}^{(1)} = \frac{1}{\sqrt{P_{CSI-RS}}}\begin{bmatrix} v_{l,m} \\ \varphi_n v_{l,m} \end{bmatrix}$$

In Table 1-1, $$W_{l,m,n}^{(1)}$$

represents a precoding matrix, and a superscript (1) represents that a quantity of transport streams is R=1. A value of $i_{1,1}$ is in a value range of $$0, 1, \ldots, \frac{N_1O_1}{2}-1.$$

A value of $i_{1,2}$ is in a value range of $$0, \ldots, \frac{N_2O_2}{2}-1.$$

A value of $i_2$ ranges from 0 to 15. In the codebook mode shown in Table 1-1, different values of $i_2$ indicate a change of the manner in which the parameters (for example, $i_{1,1}$, $i_{1,2}$, and $i_2$) are mapped to the codebook parameters (for example, l, m, and n). For example, when $i_2=0$, $l=2i_{1,1}$, $m=2i_{1,2}$, and $n=0$. For another example, when $i_2=5$, $l=2i_{1,1}+1$, $m=2i_{1,2}$, and $n=1$. In Table 1-1, the precoding matrix $$W_{l,m,n}^{(1)}$$

satisfies:

$$W_{l,m,n}^{(1)} = \frac{1}{\sqrt{P_{CSI-RS}}}\begin{bmatrix} v_{l,m} \\ \varphi_n v_{l,m} \end{bmatrix} \quad \text{Formula (1-2)}$$

$$W_{l,m,n}^{(1)}$$

represents the precoding matrix. $P_{CSI-RS}$ represents a quantity of CSI-RS ports, with a value of $2N_1 \times N_2$. $v_{l,m}$ represents a two-dimensional DFT vector. $\varphi_n$ represents a phase rotation factor between precoding matrices that control two polarization directions. $v_{l,m}$ and $\varphi_n$ satisfy the following formula:

$$\begin{cases} \varphi_n = e^{j\pi n/2} \\ u_m = \begin{cases} \begin{bmatrix} 1 & e^{j\frac{2\pi m}{O_2 N_2}} & \dots & e^{j\frac{2\pi m(N_2-1)}{O_2 N_2}} \end{bmatrix} & N_2 > 1 \\ 1 & N_2 = 1 \end{cases} \\ v_{l,m} = \begin{bmatrix} u_m & e^{j\frac{2\pi l}{O_1 N_1}} u_m & \dots & e^{j\frac{2\pi l(N_1-1)}{O_1 N_1}} u_m \end{bmatrix}^T \end{cases} \quad \text{Formula (1-3)}$$

For another example, a Type-1 single panel codebook is shown in Table 1-2.

TABLE 1-2

| Codebook mode = 1-2, $P_{CSI-RS} \geq 16$ | | | | |
|---|---|---|---|---|
| $i_{1,1}$ | $i_{1,2}$ | $i_{1,3}$ | $i_2$ | $W_{i_{1,1},i_{1,2},i_{1,3},i_2}^{(4)}$ |
| $0, 1, \dots, \frac{N_1 O_1}{2} - 1$ | $0, 1, \dots, \frac{N_2 O_2}{2} - 1$ | 0, 1, 2, 3 | 0, 1 | |
| $W_{l,m,p,n}^{(4)} = \frac{1}{\sqrt{4P_{CSI-RS}}}\begin{bmatrix} \tilde{v}_{l,m} & \tilde{v}_{l,m} & \tilde{v}_{l,m} & \tilde{v}_{l,m} \\ \theta_p \tilde{v}_{l,m} & -\theta_p \tilde{v}_{l,m} & \theta_p \tilde{v}_{l,m} & -\theta_p \tilde{v}_{l,m} \\ \varphi_n v_{l,m} & \varphi_n v_{l,m} & -\varphi_n v_{l,m} & -\varphi_n v_{l,m} \\ \varphi_n \theta_p \tilde{v}_{l,m} & -\varphi_n \theta_p \tilde{v}_{l,m} & -\varphi_n \theta_p \tilde{v}_{l,m} & \varphi_n \theta_p \tilde{v}_{l,m} \end{bmatrix}$ | | | | |

In Table 1-2, $$W_{l,m,p,n}^{(4)}$$

represents a precoding matrix, and a superscript (4) represents that a quantity of transport streams is R=4. For the value of $i_{1,1}$ and the value of $i_{1,2}$, refer to descriptions in Table 1-1. Details are not described herein again. A value of $i_{1,3}$ is one of 0, 1, 2, and 3, and a value of $i_2$ is 0 or 1. In the codebook mode shown in Table 1-2, $l=i_{1,1}$, $m=i_{1,2}$, $p=i_{1,3}$, and $n=i_2$. The precoding matrix $$W_{l,m,p,n}^{(4)}$$

satisfies:

$$W_{l,m,p,n}^{(4)} = \frac{1}{\sqrt{4P_{CSI-RS}}}\begin{bmatrix} \tilde{v}_{l,m} & \tilde{v}_{l,m} & \tilde{v}_{l,m} & \tilde{v}_{l,m} \\ \theta_p \tilde{v}_{l,m} & -\theta_p \tilde{v}_{l,m} & \theta_p \tilde{v}_{l,m} & -\theta_p \tilde{v}_{l,m} \\ \varphi_n v_{l,m} & \varphi_n v_{l,m} & -\varphi_n v_{l,m} & -\varphi_n v_{l,m} \\ \varphi_n \theta_p \tilde{v}_{l,m} & -\varphi_n \theta_p \tilde{v}_{l,m} & -\varphi_n \theta_p \tilde{v}_{l,m} & \varphi_n \theta_p \tilde{v}_{l,m} \end{bmatrix} \quad \text{Formula (1-4)}$$

$$W_{l,m,p,n}^{(4)}$$

represents the precoding matrix. $P_{CSI-RS}$ represents a quantity of CSI-RS ports. A value of $P_{CSI-RS}$ is $2N_1 \times N_2$. $\tilde{v}_{l,m}$ represents a two-dimensional DFT vector. $\varphi_n$ and $\theta_p$ represent phase rotation factors between precoding matrices that control two polarization directions. An expression of $v_{l,m}$ is the same as the formula (1-3). $\tilde{v}_{l,m}$, $\varphi_n$, and $\theta_p$ satisfy the following formula:

$$\begin{cases} \varphi_n = e^{j\pi n/2} \\ \theta_p = e^{j\pi p/4} \\ u_m = \begin{cases} \begin{bmatrix} 1 & e^{j\frac{2\pi m}{O_2 N_2}} & \dots & e^{j\frac{2\pi m(N_2-1)}{O_2 N_2}} \end{bmatrix} & N_2 > 1 \\ 1 & N_2 = 1 \end{cases} \\ \tilde{v}_{l,m} = \begin{bmatrix} u_m & e^{j\frac{4\pi l}{O_1 N_1}} u_m & \dots & e^{j\frac{4\pi l(N_1/2-1)}{O_1 N_1}} u_m \end{bmatrix}^T \end{cases} \quad \text{Formula (1-5)}$$

In conclusion, in the Type-1 single panel codebook, the precoding matrix includes two parts that respectively correspond to two polarization directions. In other words, the Type-1 single panel codebook matches a port in a dual-polarized antenna array.

It should be noted that the foregoing two-dimensional DFT vector is a general term, and the "two-dimensional" may refer to the H dimension and the V dimension. When the H-dimensional parameter $O_1N_1$ is 1, a value of l is 0, and the foregoing two-dimensional DFT vector is degraded to a one-dimensional DFT vector. Alternatively, when the V-dimensional parameter $O_2N_2$ is 1, a value of m is 0. The foregoing two-dimensional DFT vector is degraded to a one-dimensional DFT vector.

(2) The Type-1 multi-panel codebook is described as follows:

In comparison with a quantity of antenna ports of the Type-1 single panel codebook, a quantity of antenna ports of the Type-1 multi-panel codebook is greater than or equal to 8, for example, 8, 16, or 32. $N_g=2$ or $N_g=4$. The Type-1 multi-panel codebook is constructed by using $i_1$ and $i_2$. A value of $i_1$ satisfies the following formula:

$$i_1 = \begin{cases} [i_{1,1} \quad i_{1,2} \quad i_{1,4}] & R = 1 \\ [i_{1,1} \quad i_{1,2} \quad i_{1,3} \quad i_{1,4}] & R = 2 \end{cases} \qquad \text{Formula (2-1)}$$

$i_{1,1}$, $i_{1,2}$, and $i_{1,3}$ are used to determine a two-dimensional DFT vector. For details, refer to descriptions of the Type-1 single panel codebook. Details are not described herein again. $_{1,4}$ is used to determine phase rotation information between antenna panels in a plurality of antenna panels. $i_2$ is used to determine phase rotation information between different polarization directions.

In the codebook mode 1, $i_{1,4}$ satisfies the following formula (2-2):

$$i_{1,4} = \begin{cases} i_{1,4,1} & N_g = 2 \\ [i_{1,4,1} \quad i_{1,4,2} \quad i_{1,4,3}] & N_g = 4 \end{cases} \qquad \text{Formula (2-2)}$$

In the codebook mode 2, $i_{1,4}$ and $i_2$ satisfy the following formula (2-3):

$$\begin{cases} i_{1,4} = [i_{1,4,1} \quad i_{1,4,2}] \\ i_2 = [i_{2,0} \quad i_{2,1} \quad i_{2,2}] \end{cases} \qquad \text{Formula (2-3)}$$

It should be understood that, in a related protocol, the formula (2-2) is applicable to a case in which $N_g=2$ or $N_g=4$. The formula (2-3) is applicable to the case in which $N_g=2$. The formula (2-3) is also applicable when $N_g=4$. This is not limited in embodiments of this application.

For example, a Type-1 multi-panel codebook is shown in Table 2-1.

TABLE 2-1

| codebook mode = 1, $N_g \in \{2, 4\}$ | | | | |
|---|---|---|---|---|
| $i_{1,1}$ | $i_{1,2}$ | $i_{1,4,q}$, q = 1, . . . , $N_g-1$ | $i_2$ | $W^{(2)}_{i_{1,1},i_{1,1}+k_1,i_{1,2}+k_2,i_{1,4},i_2}$ |
| 0, 1, · · · , $N_1O_1 -1$ | 0, 1, · · · , $N_2O_2 -1$ | 0, 1, 2, 3 | 0, 1 | |

$$W^{(2)}_{l,l',m,m',p,n} = \frac{1}{\sqrt{2}} \left[ W^{1,N_g,1}_{l,m,p,n} \quad W^{2,N_g,1}_{l',m',p,n} \right]$$

For a mapping relationship between $i_{1,3}$ and $k_1$ and a mapping relationship between $i_{1,3}$ and $k_2$, refer to related descriptions in the 3GPP protocol TS 38.214. Details are not described herein. In Table 2-1, $$W^{(2)}_{l,l',m,m',p,n}$$

represents a precoding matrix, and a superscript (2) represents that a quantity of transport streams is R=2. A value of $i_{1,1}$ is in a value range of 0,1, . . . , $N_1O_1-1$. A value of $i_{1,2}$ is in a value range of 0, . . . , $N_2O_2-1$. A value of $i_{1,4,q}$ rangesfrom 0 to 3. A value of $i_2$ is 0 or 1. In the codebook mode shown in Table 2-1, $l=i_{1,1}$, $l'=i_{1,1}+k_1$, $m=i_{1,2}$, $m'=i_{1,2}+k_2$, $p=i_{1,4}$, and $n=i_2$. A precoding matrix $$W^{(2)}_{l,l',m,m',p,n}$$

is shown in Table 2-1.

$$W^{(2)}_{l,l',m,m',p,n}$$

represents the precoding matrix. p satisfies:

$$p = \begin{cases} p_1 & N_g = 2 \\ [p_1 \quad p_2 \quad p_3] & N_g = 4 \end{cases} \qquad \text{Formula (2-4)}$$

When $N_g=2$, $$W^{1,N_g,1}_{l,m,p,n}$$

and $$W^{2,N_g,1}_{l,m,p,n}$$

satisfy:

$$\begin{cases} W^{1,2,1}_{l,m,p,n} = \frac{1}{\sqrt{P_{CSI-RS}}} \begin{bmatrix} v_{l,m} \\ \varphi_n v_{l,m} \\ \varphi_{p_1} v_{l,m} \\ \varphi_n \varphi_{p_1} v_{l,m} \end{bmatrix} \\ W^{2,2,1}_{l,m,p,n} = \frac{1}{\sqrt{P_{CSI-RS}}} \begin{bmatrix} v_{l,m} \\ -\varphi_n v_{l,m} \\ \varphi_{p_1} v_{l,m} \\ -\varphi_n \varphi_{p_1} v_{l,m} \end{bmatrix} \end{cases} \qquad \text{Formula (2-5)}$$

When $N_g=4$, $$W^{1,N_g,1}_{l,m,p,n}$$

and $$W^{2,N_g,1}_{l,m,p,n}$$

satisfy:

Formula (2-6)

$$\begin{cases} W^{1,4,1}_{l,m,p,n} = \frac{1}{\sqrt{P_{CSI-RS}}}\begin{bmatrix} v_{l,m} \\ \varphi_n v_{l,m} \\ \varphi_{p_1} v_{l,m} \\ \varphi_n\varphi_{p_1} v_{l,m} \\ \varphi_{p_2} v_{l,m} \\ \varphi_n\varphi_{p_2} v_{l,m} \\ \varphi_{p_3} v_{l,m} \\ \varphi_n\varphi_{p_3} v_{l,m} \end{bmatrix} \\ W^{2,4,1}_{l,m,p,n} = \frac{1}{\sqrt{P_{CSI-RS}}}\begin{bmatrix} v_{l,m} \\ -\varphi_n v_{l,m} \\ \varphi_{p_1} v_{l,m} \\ -\varphi_n\varphi_{p_1} v_{l,m} \\ \varphi_{p_2} v_{l,m} \\ -\varphi_n\varphi_{p_2} v_{l,m} \\ \varphi_{p_3} v_{l,m} \\ -\varphi_n\varphi_{p_3} v_{l,m} \end{bmatrix} \end{cases}$$

In the formula (2-5) and the formula (2-6), for calculation of $v_{l,m}$ and $\varphi_n$, refer to the formula (1-3), and details are not described herein again. $\varphi_{p_i}$ represents a phase rotation of the precoding matrix that is of the i+1$^{th}$ antenna panel and that is relative to a precoding matrix of a first antenna panel. When $N_g$=2, $\varphi_{p_i}=\varphi_{p_1}$. When $N_g$=4, $\varphi_{p_i}=[\varphi_{p_1}\ \varphi_{p_2}\ \varphi_{p_3}]$. $\varphi_{p_1}$ represents a phase rotation of a precoding matrix that is of the second antenna panel and that is relative to the precoding matrix of the first antenna panel, and $\varphi_{p_1}$ is determined by using a parameter $i_{1,4,1}$. $\varphi_{p_2}$ represents a phase rotation of a precoding matrix that is of the third antenna panel and that is relative to the precoding matrix of the first antenna panel, and $\varphi_{p_2}$ is determined by using a parameter $i_{1,4,2}$. $\varphi_{p_3}$ represents a phase rotation of the precoding matrix of the fourth antenna panel relative to the precoding matrix of the first antenna panel, and $\varphi_{p_3}$ is determined by using a parameter $i_{1,4,3}$.

For another example, a Type-1 multi-panel codebook is shown in Table 2-2.

TABLE 2-2

| Codebook mode = 2, $N_g$ = 2 | | | | |
|---|---|---|---|---|
| $i_{1,1}$ | $i_{1,2}$ | $i_{1,4,q,q=1,2}$ | $i_{2,q,q=0,1,2}$ | $W^{(2)}_{i_{1,1},i_{1,1}+k_1,i_{1,2}+k_2,i_{1,4},i_2}$ |
| 0, 1, · · · , $N_1O_1$ −1 | 0, 1, · · · , $N_2O_2$ −1 | 0, 1, 2, 3 | 0, 1 | |

$$W^{(2)}_{l,l',m,m',p,n} = \frac{1}{\sqrt{2}}\begin{bmatrix} W^{1,N_g,2}_{l,m,p,n} & W^{2,N_g,2}_{l',m',p,n} \end{bmatrix}$$

For the value of $i_{1,1}$, the value of $i_{1,2}$, the value of $i_{1,3}$, and the value of $i_{1,4,q}$, refer to related descriptions in Table 2-1. Details are not described herein again. The value of $i_{2,q}$ is 0 or 1. The precoding matrix $$W^{(2)}_{l,l',m,m',p,n}$$

is shown in Table 2-2.

p and n satisfy $$\begin{cases} p = [p_1\ \ p_2] \\ n = [n_0\ \ n_1\ \ n_2] \end{cases} \quad \text{Formula (2-7)}$$

When $N_g$=2, $$W^{1,N_g,2}_{l,m,p,n} \text{ and } W^{2,N_g,2}_{l',m',p,n}$$

satisfy:

$$\begin{cases} W^{1,2,2}_{l,m,p,n} = \frac{1}{\sqrt{P_{CSI-RS}}}\begin{bmatrix} v_{l,m} \\ \varphi_{n_0} v_{l,m} \\ a_{p_1} b_{n_1} v_{l,m} \\ a_{p_2} b_{n_2} v_{l,m} \end{bmatrix} \\ W^{2,2,2}_{l,m,p,n} = \frac{1}{\sqrt{P_{CSI-RS}}}\begin{bmatrix} v_{l,m} \\ -\varphi_{n_0} v_{l,m} \\ a_{p_1} b_{n_1} v_{l,m} \\ -a_{p_2} b_{n_2} v_{l,m} \end{bmatrix} \end{cases} \quad \text{Formula (2-8)}$$

In the formula (2-8), for calculation of $v_{l,m}$ and $\varphi_{n_0}$, refer to the formula (1-3), and details are not described herein again. $a_p$ and $b_n$ satisfy:

$$\begin{cases} a_p = e^{j\pi/4}e^{j\pi p/2} \\ b_n = e^{-j\pi/4}e^{j\pi n/2} \end{cases} \quad \text{Formula (2-9)}$$

$\varphi_{n_0}$ represents a rotation phase of a precoding matrix that is in the polarization direction B of the first antenna panel and that is relative to a precoding matrix in the polarization direction A of the first antenna panel, and is determined by using a parameter $i_{2,0}$. $a_{p_1}b_{n_1}$ represents a rotation phase of a precoding matrix that is in the polarization direction A of the second antenna panel and that is relative to the precoding matrix in the polarization direction A of the first antenna panel, and is jointly determined by using parameters $i_{1,4,1}$ and $i_{2,1}$. $a_{p_2}b_{n_2}$ represents a rotation phase of a precoding matrix that is in the polarization direction B of the second antenna panel and that is relative to the precoding matrix in the polarization direction A of the first antenna panel, and is jointly determined by using the parameters $i_{1,4,2}$ and $i_{2,2}$.

In conclusion, in the Type-1 multi-panel codebook, the precoding matrix includes two parts that respectively correspond to two polarization directions. In other words, the Type-1 multi-panel codebook matches a port in a dual-polarized antenna array.

(3) A Type-2 codebook is described as follows:

In a Type-1 codebook (for example, the Type-1 single panel codebook or the Type-1 multi-panel codebook), a precoding vector corresponding to each transport stream is a two-dimensional DFT vector. In the Type-2 codebook, a precoding vector corresponding to each transport stream is a linear weighted value of S two-dimensional DFT vectors. The linear weighted value includes an amplitude coefficient and a phase coefficient. The amplitude coefficient includes a wideband (WB) amplitude coefficient and a subband (SB) amplitude coefficient. The phase coefficient includes an SB phase coefficient. The quantity of transport streams is R=1 or R=2. The Type-2 codebook is constructed by using $i_1$ and $i_2$. A value of $i_1$ satisfies the following formula:

$$i_1 = \begin{cases} [i_{1,1} \ \ i_{1,2} \ \ i_{1,3,1} \ \ i_{1,4,1}] & R=1 \\ [i_{1,1} \ \ i_{1,2} \ \ i_{1,3,1} \ \ i_{1,4,1} \ \ i_{1,3,2} \ \ i_{1,4,2}] & R=2 \end{cases} \qquad \text{Formula (3-1)}$$

$i_{1,1}$ and $i_{1,2}$ are used to jointly determine S two-dimensional DFT vectors. A value of $i_{1,1}$ satisfies:

$$\begin{cases} i_{1,1} = [q_1 \ q_2] \\ q_1 \in \{0, 1, \ldots, O_1 - 1\} \\ q_2 \in \{0, 1, \ldots, O_2 - 1\} \end{cases} \qquad \text{Formula (3-2)}$$

A value of $i_{1,2}$ satisfies:

$$i_{1,2} \in \left\{ 0, 1, \ldots, \binom{N_1 N_2}{S} - 1 \right\} \qquad \text{Formula (3-3)}$$

For example, a process of determining the S two-dimensional DFT vectors is as follows: $i_{1,2}$ is used to select the S two-dimensional DFT vectors from $N_1 N_2$ two-dimensional DFT vectors. Oversampling factors of the $N_1 N_2$ two-dimensional DFT vectors are set to 1. $q_1$ is used to determine an offset value when an oversampling factor is given in the horizontal dimension. $q_2$ is used to determine the offset value when an oversampling factor is given in the vertical dimension.

$i_{1,3,r}$ represents an index of strongest two-dimensional DFT vectors of the $(r+1)^{th}$ transport stream. A value range of $i_{1,3,r}$ is $[0,1,\ldots,2S-1]$. In other words, $i_{1,3,r}$ can indicate whether a strongest linear weighted value corresponds to the polarization direction A or the polarization direction B, and can indicate a base vector that corresponds to the strongest linear weighted value in the polarization direction.

$$i_{1,4,r} = \left[ k_{r,0}^{(1)}, k_{r,1}^{(1)}, \ldots, k_{r,2S-1}^{(1)} \right]$$

represents wideband amplitude coefficients $$p_{i,l}^{(1)}$$

sub-precoding-vectors that are of the $(r+1)^{th}$ transport stream in the polarization direction A and that are respectively on the S two-dimensional DFT vectors, and wideband amplitude coefficients $$p_{i,l+S}^{(1)}$$

of sub-precoding-vectors that are of the $(r+1)^{th}$ transport stream in the polarization direction B and that are respectively on the S two-dimensional DFT vectors. For example, each wideband amplitude coefficient is quantized by using three bits.

A value of $i_2$ satisfies the following formula:

$$i_2 = \begin{cases} [i_{2,1,1}] & \text{Formula (3-4)} \\ [i_{2,1,1} \ \ i_{2,1,2}] \\ [i_{2,1,1} \ \ i_{2,2,1}] \\ [i_{2,1,1} \ \ i_{2,2,1} \ \ i_{2,1,2} \ \ i_{2,2,2}] \end{cases}$$

In the formula (3-4), the value of $i_2$ is related to a subband amplitude (subbandAmplitude) parameter and R. For example, when R=1 and "subbandAmplitude=false", $i_2 = i_{2,1,1}$. When R=2 and "subbandAmplitude=false", $i_2 = [i_{2,1,1} \ i_{2,1,2}]$. When R=1 and "subbandAmplitude=true", $i_2 = [i_{2,1,1} \ i_{2,2,1}]$. When R=2 and "subbandAmplitude=true", $i_2 = [i_{2,1,1} \ i_{2,2,1} \ i_{2,1,2} \ i_{2,2,2}]$.

$i_{2,1,r} = [c_{r,0}, c_{r,1}, \ldots, c_{r,2S-1}]$ represents subband phase coefficients $\varphi_{i,l}$ of the sub-precoding-vectors that are of the $(r+1)^{th}$ transport stream in the polarization direction A and that are respectively on the S two-dimensional DFT vectors, and subband phase coefficients $\varphi_{i,l+S}$ of the sub-precoding-vectors that are of the $(r+1)^{th}$ transport stream in the polarization direction B and that are respectively on the S two-dimensional DFT vectors. For example, quantization precision of each subband phase coefficient is selected from a phase shift-keying (PSK) constellation diagram (for example, an N-PSK constellation diagram), and is determined by using a parameter $N_{PSK}$, where $N_{PSK}=4$ or $N_{PSK}=8$.

$$i_{2,2,r} = \left[ k_{r,0}^{(2)}, k_{r,1}^{(2)}, \ldots, k_{r,2S-1}^{(2)} \right]$$

represents subband amplitude coefficients $$p_{i,l}^{(2)}$$

of the sub-precoding-vectors that are of the $(r+1)^{th}$ transport stream in the polarization direction A and that are respectively on the S two-dimensional DFT vectors, and subband amplitude coefficients $$p_{i,l+S}^{(2)}$$

of the sub-precoding-vectors that are of the $(r+1)^{th}$ transport stream in the polarization direction B and that are respectively on the S two-dimensional DFT vectors. For example, each subband amplitude coefficient is quantized by using one bit.

For example, the Type-2 codebook is shown in Table 3-1.

TABLE 3-1

| | |
|---|---|
| R = 1 | $W^{(1)}_{q_1,q_2,n_1,n_2,p_1^{(1)},p_1^{(2)},i_{2,1,1}} = W^{1}_{q_1,q_2,n_1,n_2,p_1^{(1)},p_1^{(2)},i_{2,1,1}}$ |
| R = 2 | $W^{(2)}_{q_1,q_2,n_1,n_2,p_1^{(1)},p_1^{(2)},i_{2,1,1},p_2^{(1)},p_2^{(2)},i_{2,1,2}} = \frac{1}{\sqrt{2}}\left[ W^{1}_{q_1,q_2,n_1,n_2,p_1^{(1)},p_1^{(2)},i_{2,1,1}} \quad W^{2}_{q_1,q_2,n_1,n_2,p_2^{(1)},p_2^{(2)},i_{2,1,2}} \right]$ |
| $W^{l}_{q_1,q_2,n_1,n_2,p_l^{(1)},p_l^{(2)},c_l} = \frac{1}{\sqrt{N_1 N_2 \sum_{i=0}^{2S-1} \left(p_{l,i}^{(1)} p_{l,i}^{(2)}\right)^2}} \begin{bmatrix} \sum_{i=0}^{S-1} v_{m_1^{(i)},m_2^{(i)}} p_{i,l}^{(1)} p_{i,l}^{(2)} \varphi_{i,l} \\ \sum_{i=0}^{S-1} v_{m_1^{(i)},m_2^{(i)}} p_{i,l+S}^{(1)} p_{i,l+S}^{(2)} \varphi_{i,l+S} \end{bmatrix}$ | |
| l = 1, 2 | |

In Table 2-2, $$m_1^{(i)}$$

represents an index of $$v_{m_1^{(i)},m_2^{(i)}}$$

in the horizontal dimension when the oversampling factor is given.

$$m_2^{(i)}$$

represents an index of $$v_{m_1^{(i)},m_2^{(i)}}$$

in the vertical dimension when the oversampling factor is given. For calculation of $$v_{m_1^{(i)},m_2^{(i)}},$$

refer to the formula (1-3), and details are not described herein again.

In conclusion, in the Type-2 codebook, a precoding vector of each transport stream includes two parts that respectively correspond to sub-precoding-vectors in the two polarization directions. In other words, the Type-2 codebook matches a port in a dual-polarized antenna array.

(4) A Type-2 port selection codebook is described as follows:

In the Type-2 port selection codebook, a precoding vector corresponding to each transport stream is a linear weighted value of S unit vectors. For descriptions of a linear weighted value and a quantity of transport streams, refer to the descriptions of the Type-2 codebook. Details are not described herein again. The Type-2 port selection codebook is constructed by using $i_1$ and $i_2$. A value of $i_1$ satisfies the following formula:

$$i_1 = \begin{cases} [i_{1,1} \;\; i_{1,3,1} \;\; i_{1,4,1}] & R = 1 \\ [i_{1,1} \;\; i_{1,3,1} \;\; i_{1,4,1} \;\; i_{1,3,2} \;\; i_{1,4,2}] & R = 2 \end{cases} \quad \text{Formula (4-1)}$$

$i_{1,1}$ determines S unit vectors. A value of $i_{1,1}$ satisfies the formula (3-2).

For example, a process of determining S unit vectors is as follows: First, a port selection sampling size (portSelectionSamplingSize) parameter d is determined, where d does not satisfy d≤min $\{P_{CSI-RS}/2, S\}$. Then S unit vectors are determined based on the value of $i_{1,1}$. $i_{1,1} \in \{0,1, \ldots, \lceil P_{CSI-RS}2d \rceil\}$. One of the S unit vectors may be denoted as $v_{i_{1,1}d+l}$, where l=0,1, . . . , S−1. $v_{i_{1,1}d+l}$ is a vector with a length of $P_{CSI-RS}/2$. In $v_{i_{1,1}d+l}$, a value of the $(i_{1,1}d+l+1)^{th}$ element is 1, and values of other elements are 0.

$i_{1,3,r}$ represents an index of strongest unit vectors of the $(r+1)^{th}$ transport stream. A value range of $i_{1,3,r}$ is [0,1, . . . , 2S−1]. In other words, $i_{1,3,r}$ indicates whether a strongest linear weighted value corresponds to the polarization direction A or the polarization direction B, and indicates a base vector number that corresponds to the strongest linear weighted value in the polarization direction.

$$i_{1,4,r} = \left[k_{r,0}^{(1)}, k_{r,1}^{(1)}, \ldots, k_{r,2S-1}^{(1)}\right]$$

represents wideband amplitude coefficients $$p_{i,l}^{(1)}$$

of $(r+1)^{th}$ sub-precoding-vectors that are with a transport stream in the polarization direction A and that are on the S unit vectors, and wideband amplitude coefficients $$p_{i,l+S}^{(2)}$$

of $(r+1)^{th}$ sub-precoding-vectors that are with a transport stream in the polarization direction B and that are on the S unit vectors. For example, each wideband amplitude coefficient is quantized by using three bits.

For a value of $i_2$, refer to the descriptions of the Type-2 codebook. Details are not described herein again.

$i_{2,1,r}=[c_{r,0}, c_{r,1}, \ldots, c_{r,2S-1}]$ represents subband phase coefficients $\varphi_{i,l}$ of the $(r+1)^{th}$ sub-precoding-vectors that are with the transport stream in the polarization direction A and that are on the S unit vectors, and subband phase coefficients $\varphi_{i,l+S}$ of the $(r+1)^{th}$ sub-precoding-vectors that are with the transport stream in the polarization direction B and that on the S unit vectors. For example, quantization precision of each subband phase coefficient is selected from a PSK constellation diagram (for example, an N-PSK constellation diagram), and is determined by using the parameter $N_{PSK}$, where $N_{PSK}=4$, or $N_{PSK}=8$.

$$i_{2,2,r} = \left[k_{r,0}^{(2)}, k_{r,1}^{(2)}, \ldots , k_{r,2S-1}^{(2)}\right]$$

represents subband phase coefficients $$p_{i,l}^{(2)}$$

of the $(r+1)^{th}$ sub-precoding-vectors that are with the transport stream in the polarization direction A and that are on the S unit vectors, and subband phase coefficients $$p_{i,l+S}^{(2)}$$

of the $(r+1)^{th}$ sub-precoding-vectors that are with the transport stream in the polarization direction B and that on the S unit vectors. For example, each subband amplitude coefficient is quantized by using one bit.

For example, the Type-2 port selection codebook is shown in Table 4-1.

TABLE 4-1

| | |
|---|---|
| R = 1 | $W^{(1)}_{i_{1,1},p_1^{(1)},p_1^{(2)},i_{2,1,1}} = W^{1}_{i_{1,1},p_1^{(1)},p_1^{(2)},i_{2,1,1}}$ |
| R = 2 | $W^{(2)}_{i_{1,1},p_1^{(1)},p_1^{(2)},i_{2,1,1},p_2^{(1)},p_2^{(2)},i_{2,1,2}} = \frac{1}{\sqrt{2}}\left[\begin{matrix} W^{1}_{i_{1,1},p_1^{(1)},p_1^{(2)},i_{2,1,1}} & W^{2}_{i_{i,i},p_2^{(1)},p_2^{(2)},i_{2,1,2}} \end{matrix}\right]$ |

$$W^{l}_{i_{1,1},p_l^{(1)},p_l^{(2)},i_{2,1,l}} = \frac{1}{\sqrt{\sum_{i=0}^{2S-1}\left(p_{l,i}^{(1)}p_{l,i}^{(2)}\right)^2}}\left[\begin{matrix} \sum_{i=0}^{S-1} v_{i_{1,1}d+l}\, p_{i,l}^{(1)}\, p_{i,l}^{(2)}\, \varphi_{i,l} \\ \sum_{i=0}^{S-1} v_{i_{1,1}d+l}\, p_{i,l+S}^{(1)}\, p_{i,l+S}^{(2)}\, \varphi_{i,l+S} \end{matrix}\right]$$

l = 1 ,2.

In conclusion, in the Type-2 port selection codebook, a precoding vector of each transport stream includes two parts that respectively correspond to sub-precoding-vectors in the two polarization directions. In other words, the Type-2 port selection codebook matches a port in a dual-polarized antenna array.

(5) The enhanced Type-2 codebook (enhanced Type-II codebook) is described as follows:

In the Type-2 codebook, a subband PMI feedback is supported. In this case, a linear weighted value of each subband includes a subband amplitude coefficient and a subband phase coefficient, and a parameter feedback amount is large. In the enhanced Type-2 codebook, a space-frequency two-dimensional joint feedback is performed. It is assumed that a quantity of subbands for which PMIs are to feed back in the enhanced Type-2 codebook is $N_3$. The enhanced Type-2 codebook includes a precoding matrix $2N_1N_2 \times N_3 \times R$. On each transport stream, a space-frequency two-dimensional precoding matrix W of $2N_1\,N_2 \times N_3$ dimensions may be represented as a matrix formed by three matrices: a matrix $W_1$ that is of $2N_1N_2 \times 2L$ dimensions and that is formed by a space domain (SD) base vector, a matrix $W_f$ that is of $N_3 \times M$ dimensions and that is formed by a frequency domain (FD) base vector, and a coefficient matrix $\tilde{W}_2$ that is formed by performing linear combination on column vectors. The SD base vector is a two-dimensional DFT vector. The FD base vector is a one-dimensional DFT vector at a size of $N_3$.

A maximum quantity of transport streams supported by the enhanced Type-2 codebook is R=4. Each space-frequency two-dimensional precoding matrix W is constructed by using $i_1$ and $i_2$. A value of $i_1$ satisfies the following formula:

$$i_1 = \begin{cases} [i_{1,1}\ i_{1,2}\ i_{1,5}\ i_{1,6,1}\ i_{1,7,1}\ i_{1,8,1}] & R=1 \\ [i_{1,1}\ i_{1,2}\ i_{1,5}\ i_{1,6,1}\ i_{1,7,1}\ i_{1,8,1}\ i_{1,6,2}\ i_{1,7,2}\ i_{1,8,2}] & R=2 \\ [i_{1,1}\ i_{1,2}\ i_{1,5}\ i_{1,6,1}\ i_{1,7,1}\ i_{1,8,1}\ i_{1,6,2}\ i_{1,7,2}\ i_{1,8,2}\ i_{1,6,3}\ i_{1,7,3}\ i_{1,8,3}] & R=3 \\ [i_{1,1}\ i_{1,2}\ i_{1,5}\ i_{1,6,1}\ i_{1,7,1}\ i_{1,8,1}\ i_{1,6,2}\ i_{1,7,2}\ i_{1,8,2}\ i_{1,6,3}\ i_{1,7,3}\ i_{1,8,3}\ i_{1,6,4}\ i_{1,7,4}\ i_{1,8,4}] & R=4 \end{cases} \quad \text{Formula (5-1)}$$

A value of $i_2$ satisfies the following formula:

$$i_2 = \begin{cases} [i_{2,3,1}\ i_{2,4,1}\ i_{2,5,1}] & R=1 \\ [i_{2,3,1}\ i_{2,4,1}\ i_{2,5,1}\ i_{2,3,2}\ i_{2,4,2}\ i_{2,5,2}] & R=2 \\ [i_{2,3,1}\ i_{2,4,1}\ i_{2,5,1}\ i_{2,3,2}\ i_{2,4,2}\ i_{2,5,2}\ i_{2,3,3}\ i_{2,4,3}\ i_{2,5,3}] & R=3 \\ [i_{2,3,1}\ i_{2,4,1}\ i_{2,5,1}\ i_{2,3,2}\ i_{2,4,2}\ i_{2,5,2}\ i_{2,3,3}\ i_{2,4,3}\ i_{2,5,3}\ i_{2,3,4}\ i_{2,4,4}\ i_{2,5,4}] & R=4 \end{cases} \quad \text{(Formula 5-2)}$$

In a process of determining the enhanced Type-2 codebook, the following items need to be determined:

A first item is the quantity of subbands $N_3$.

A second item is a quantity S of SD base vectors. The quantity S of SD base vectors is determined based on a parameter ParaCombination-r16. S SD base vectors are jointly determined based on $i_{1,1}$ and $i_{1,2}$. For details, refer to the descriptions of the Type-2 codebook. Details are not described herein again.

A third item is a quantity $M_r$ of FD base vectors of the $r^{th}$ transport stream, where $$M_r = \left\lceil p_r \frac{N_3}{R} \right\rceil.$$

$K_0$ is a maximum quantity of non-zero (NZ) linear combination (LC) coefficients, and satisfies $K_0 \leq \lceil \beta * 2SM_1 \rceil$. $M_1$ represents a quantity of FD base vectors of the $1^{st}$ transport stream. For values of β and S, refer to Table 5-1.

TABLE 5-1

| ParaCombination-r16 | S | $p_r$ R ∈ {1, 2} | $p_r$ R ∈ {3, 4} | β |
|---|---|---|---|---|
| 1 | 2 | 1/4 | 1/8 | 1/4 |
| 2 | 2 | 1/4 | 1/8 | 1/2 |
| 3 | 4 | 1/4 | 1/8 | 1/4 |
| 4 | 4 | 1/4 | 1/8 | 1/2 |
| 5 | 4 | 1/4 | 1/4 | 3/4 |
| 6 | 4 | 1/4 | 1/4 | 1/2 |
| 7 | 6 | 1/4 | / | 1/2 |
| 8 | 6 | 1/4 | / | 3/4 |

In Table 5-1, when a value of ParaCombination-r16 is 1, the value of S is 2, and the value of β is ¼. When R∈{1,2}, the value of $p_r$ is ¼. When R∈{3,4}, the value of $p_r$ is ⅛. For another case, refer to Table 5-1. Details are not described herein again.

An index of one FD base vector is denoted as 0. Indexes of two or more FD base vectors are respectively denoted as 0 and $$n_{3,i} \cdot n_{3,r} = \left[n_{3,r}^{(0)}, \ldots, n_{3,r}^{(M_r-1)}\right],$$

and is determined by using parameters $i_{1,6,r}$ and $i_{1,5}$. For details, refer to a conventional technology. Details are not described herein.

A fourth item is an NZ LC coefficient. The following describes the NZ LC coefficient in three aspects:

A first aspect is related to a position of the NZ LC coefficient. The position of the NZ LC coefficient is determined by a parameter $i_{1,7,r}$, where $i_{1,7,r}$ satisfies:

$$\begin{cases} i_{1,7,r} = \left[k_{r,0}^{(3)} \ldots k_{r,M_r-1}^{(3)}\right] \\ k_{r,f}^{(3)} = \left[k_{r,0,f}^{(3)} \ldots k_{r,2S-1,f}^{(3)}\right] \\ k_{r,l,f}^{(3)} \in \{0, 1\} \\ f = [0, 1, \ldots, M_r - 1] \end{cases} \quad \text{Formula (5-3)}$$

$$k_{r,l,f}^{(3)}$$

indicates whether an LC coefficient corresponding to the $(f+1)^{th}$ FD base vector and the $(l+1)^{th}$ SD base vector in the $(r+1)^{th}$ transport stream is NZ or 0. If $$k_{r,l,f}^{(3)} = 0,$$

a value of the LC coefficient at the position is 0, and a feedback is not needed. If $$k_{r,l,f}^{(3)} = 1,$$

a value of the LC coefficient at the position is non-zero, and a feedback is needed.

A second aspect is related to a position of a strongest NZ LC coefficient of each transport stream. The position of the strongest NZ LC coefficient of each transport stream is denoted as $$(l_r^*, f_r^*),$$

where $$f_r^* = 0,$$

and $$l_r^*$$

is determined by using a parameter $i_{1,8,r}$.

A third aspect is related to amplitude information and phase information of the NZ LC coefficient.

For the R transport streams, the terminal reports an NZ LC coefficient of each transport stream to a network device. The NZ LC coefficient of each transport stream includes a common coefficient, an LC amplitude coefficient, and an LC phase coefficient.

The common coefficient is denoted as $$[p_{r,0}^{(1)}, p_{r,1}^{(1)}],$$

and is determined by using a parameter $i_{2,3,r}$, where $$i_{2,3,r} = [k_{r,0}^{(1)}\ k_{r,1}^{(1)}].$$

The LC amplitude coefficient is denoted as $$p_{r,l,f}^{(2)},$$

where $$f = 0, 1, \ldots, M_r - 1 \cdot p_{r,l,f}^{(2)}$$

is determined by using a parameter $i_{2,4,r}$. The parameter $i_{2,4,r}$ satisfies:

$$\begin{cases} i_{2,4,r} = [k_{r,0}^{(2)} \ \ldots \ k_{r,M_r-1}^{(2)}] \\ k_{r,f}^{(2)} = [k_{r,0,f}^{(2)} \ \ldots \ k_{r,2S-1,f}^{(2)}] \end{cases} \quad \text{Formula (5-4)}$$

The LC phase coefficient is denoted as $\varphi_{i,l,f}$, where $$f = 0, 1, \ldots, M_r - 1 \cdot p_{r,l,f}^{(2)}$$

is determined by using a parameter i_(2,5,r). The parameter $i_{2,5,r}$ satisfies the following requirements:

$$\begin{cases} i_{2,5,r} = [c_{r,0} \ \ldots \ c_{r,M_r-1}] \\ c_{r,f} = [c_{r,0,f} \ \ldots \ c_{r,2S-1,f}] \end{cases} \quad \text{Formula (5-5)}$$

For example, the enhanced Type-2 codebook is shown in Table 5-2.

TABLE 5-2

R = 1 $W^{(1)}_{q_1,q_2,n_1,n_2,n_{3,1},p_1^{(1)},p_1^{(2)},i_{2,5,1},t} = W^1_{q_1,q_2,n_1,n_2,n_{3,1},p_1^{(1)},p_1^{(2)},i_{2,5,1},t}$

R = 2 $W^{(2)}_{q_1,q_2,n_1,n_2,n_{3,1},p_1^{(1)},p_1^{(2)},i_{2,5,1},n_{3,2},p_2^{(1)},p_2^{(2)},i_{2,5,2},t} = \frac{1}{\sqrt{2}}\left[ W^1_{q_1,q_2,n_1,n_2,n_{3,1},p_1^{(1)},p_1^{(2)},i_{2,5,1},t} \quad W^2_{q_1,q_2,n_1,n_2,n_{3,2},p_2^{(1)},p_2^{(2)},i_{2,5,2},t} \right]$ R = 3 $W^{(3)}_{q_1,q_2,n_1,n_2,n_{3,1},p_1^{(1)},p_1^{(2)},i_{2,5,1},n_{3,2},p_2^{(1)},p_2^{(2)},i_{2,5,2},n_{3,3},p_3^{(1)},p_3^{(2)},i_{2,5,3},t} =$ $$\frac{1}{\sqrt{3}}\left[ W^1_{q_1,q_2,n_1,n_2,n_{3,1},p_1^{(1)},p_1^{(2)},i_{2,5,1},t} \quad W^2_{q_1,q_2,n_1,n_2,n_{3,2},p_2^{(1)},p_2^{(2)},i_{2,5,2},t} \quad W^3_{q_1,q_2,n_1,n_2,n_{3,3},p_3^{(1)},p_3^{(2)},i_{2,5,3},t} \right]$$

R = 4 $W^{(4)}_{q_1,q_2,n_1,n_2,n_{3,1},p_1^{(1)},p_1^{(2)},i_{2,5,1},n_{3,2},p_2^{(1)},p_2^{(2)},i_{2,5,2},n_{3,3},p_3^{(1)},p_3^{(2)},i_{2,5,3},n_{3,4},p_4^{(1)},p_4^{(2)},i_{2,5,4},t} =$ $$\frac{1}{\sqrt{2}}\left[ W^1_{q_1,q_2,n_1,n_2,n_{3,1},p_1^{(1)},p_1^{(2)},i_{2,5,1},t} \quad W^2_{q_1,q_2,n_1,n_2,n_{3,2},p_2^{(1)},p_2^{(2)},i_{2,5,2},t} \quad W^3_{q_1,q_2,n_1,n_2,n_{3,3},p_3^{(1)},p_3^{(2)},i_{2,5,3},t} \quad W^4_{q_1,q_2,n_1,n_2,n_{3,4},p_4^{(1)},p_4^{(2)},i_{2,5,4},t} \right]$$

$$W^l_{q_1,q_2,n_1,n_2,n_3,p_1^{(1)},p_1^{(2)},i_{2,5,l},t} = \frac{1}{\sqrt{N_1 N_2 \gamma_{t,l}}} \begin{bmatrix} \sum_{i=0}^{S-1} v_{m_1^{(i)},m_2^{(i)}} p_{l,0}^{(1)} \sum_{f=0}^{M_r-1} y_{t,l}^{(f)} p_{i,l,f}^{(2)} \varphi_{i,l,f} \\ \sum_{i=0}^{S-1} v_{m_1^{(i)},m_2^{(i)}} p_{l,1}^{(1)} \sum_{f=0}^{M_r-1} y_{t,l}^{(f)} p_{i,l+S,f}^{(2)} \varphi_{i,l+S,f} \end{bmatrix}$$

$$\gamma_{t,l} = \sum_{i=0}^{2S-1} \left(p_{l,\left|\frac{i}{S}\right|}^{(1)}\right)^2 \left| \sum_{f=0}^{M_r-1} y_{t,l}^{(f)} p_{i,l,f}^{(2)} \varphi_{i,l,f} \right|^2$$

$$y_{t,i}^{(f)} = e^{j\frac{2\pi t n_{3,i}^{(f)}}{N_3}}, \ t = 0, 1 \ldots N_3 - 1$$

l = 1, 2, 3, 4

In conclusion, in the enhanced Type-2 codebook, a precoding vector of each transport stream includes two parts that respectively correspond to sub-precoding-vectors in the two polarization directions. In other words, the enhanced Type-2 codebook matches a port in a dual-polarized antenna array.

(6) Enhanced Type-2 port selection codebook (enhanced Type-II port selection codebook) is described as follows:

In comparison with the S SD base vectors in the enhanced Type-2 codebook, S SD basis vectors in the enhanced port selection Type-2 codebook are unit vectors. The S SD base vectors are determined based on $i_{1,1}$. For details, refer to the descriptions of the Type-2 port selection codebook. Details are not described herein again.

A maximum quantity of transport streams supported by the enhanced Type-2 port selection codebook is R=4. Each space-frequency two-dimensional precoding matrix W is constructed by using $i_1$ and $i_2$. A value of $i_1$ satisfies the following formula:

$$i_1 = \begin{cases} [i_{1,1}\ \ i_{1,5}\ \ i_{1,6,1}\ \ i_{1,7,1}\ \ i_{1,8,1}] & R=1 \\ [i_{1,1}\ \ i_{1,5}\ \ i_{1,6,1}\ \ i_{1,7,1}\ \ i_{1,8,1}\ \ i_{1,6,2}\ \ i_{1,7,2}\ \ i_{1,8,2}] & R=2 \\ [i_{1,1}\ \ i_{1,5}\ \ i_{1,6,1}\ \ i_{1,7,1}\ \ i_{1,8,1}\ \ i_{1,6,2}\ \ i_{1,7,2}\ \ i_{1,8,2}\ \ i_{1,6,2}\ \ i_{1,7,3}\ \ i_{1,8,3}] & R=3 \\ [i_{1,1}\ \ i_{1,5}\ \ i_{1,6,1}\ \ i_{1,7,1}\ \ i_{1,8,1}\ \ i_{1,6,2}\ \ i_{1,7,2}\ \ i_{1,8,2}\ \ i_{1,6,2}\ \ i_{1,7,3}\ \ i_{1,8,3}\ \ i_{1,6,4}\ \ i_{1,7,4}\ \ i_{1,8,4}] & R=4 \end{cases} \quad \text{Formula (6-1)}$$

A value of $i_2$ satisfies the formula (5-2), and details are not described herein again.

For a process of determining the enhanced Type-2 port selection codebook, refer to the descriptions of the enhanced Type-2 codebook. Details are not described herein again.

For example, the enhanced Type-2 port selection codebook is shown in Table 6-1.

TABLE 6-1

R = 1 $W^{(1)}_{i_{1,1},n_{3,1},p_1^{(1)},p_1^{(2)},i_{2,5,1},t} = W^{1}_{i_{1,1},n_{3,1},p_1^{(1)},p_1^{(2)},i_{2,5,1},t}$

R = 2 $W^{(2)}_{i_{1,1},n_{3,1},p_1^{(1)},p_1^{(2)},i_{2,5,1},n_{3,2},p_2^{(1)},p_2^{(2)},i_{2,5,2},t} = \frac{1}{\sqrt{2}}\left[ W^{1}_{i_{1,1},n_{3,1},p_1^{(1)},p_1^{(2)},i_{2,5,1},t} \quad W^{2}_{i_{i,i},n_{3,2},p_1^{(1)},p_2^{(2)},i_{2,5,2},t} \right]$ R = 3 $W^{(3)}_{i_{1,1},n_{3,1},p_1^{(1)},p_1^{(2)},i_{2,5,1},n_{3,2},p_2^{(1)},p_2^{(2)},i_{2,5,2},n_{3,3},p_3^{(1)},p_3^{(2)},i_{2,5,3},t} =$ $$\frac{1}{\sqrt{3}}\left[ W^{1}_{i_{1,1},n_{3,1},p_1^{(1)},p_1^{(2)},i_{2,5,1},t} \quad W^{2}_{i_{i,i},n_{3,2},p_2^{(1)},p_2^{(2)},i_{2,5,2},t} \quad W^{3}_{i_{i,i},n_{3,3},p_3^{(1)},p_3^{(2)},i_{2,5,3},t} \right]$$

R = 4 $W^{(4)}_{i_{1,1},n_{3,1},p_1^{(1)},p_1^{(2)},i_{2,5,1},n_{3,2},p_2^{(1)},p_2^{(2)},i_{2,5,2},n_{3,3},p_3^{(1)},p_3^{(2)},i_{2,5,3},n_{3,4},p_4^{(1)},p_4^{(2)},i_{2,5,4},t} =$ $$\frac{1}{\sqrt{2}}\left[ W^{1}_{i_{1,1},n_{3,1},p_1^{(1)},p_1^{(2)},i_{2,5,1},t} \quad W^{2}_{i_{1,1},n_{3,2},p_2^{(1)},p_2^{(2)},i_{2,5,2},t} \quad W^{3}_{i_{1,1},n_{3,3},p_3^{(1)},p_3^{(2)},i_{2,5,3},t} \quad W^{4}_{i_{1,1},n_{3,4},p_4^{(1)},p_4^{(2)},i_{2,5,4},t} \right]$$

$$W^{l}_{i_{1,1},n_3,p_l^{(1)},p_l^{(2)},i_{2,5,l},t} = \frac{1}{\sqrt{\gamma_{t,l}}}\begin{bmatrix} \sum_{i=0}^{S-1} v_{i_{1,1}d+l}\, p_{l,0}^{(1)} \sum_{f=0}^{M_r-1} y_{t,l}^{(f)}\, p_{i,l,f}^{(2)} \varphi_{i,l,f} \\ \sum_{i=0}^{S-1} v_{i_{1,1}d+l}\, p_{l,1}^{(1)} \sum_{f=0}^{M_r-1} y_{t,l}^{(f)}\, p_{i,l+S,f}^{(2)} \varphi_{i,l+S,f} \end{bmatrix}$$

$$\gamma_{t,l} = \sum_{i=0}^{2S-1} \left( p^{(1)}_{l,\left|\frac{i}{S}\right|} \right)^2 \left| \sum_{f=0}^{M_r-1} y_{t,l}^{(f)}\, p_{i,l,f}^{(2)} \varphi_{i,l,f} \right|^2$$

$$y_{t,i}^{(f)} = e^{j\frac{2\pi t n_{3,i}^{(f)}}{N_3}},\ t = 0, 1 \ldots N_3 - 1$$

l = 1, 2, 3, 4

In conclusion, in the enhanced Type-2 port selection codebook, a precoding vector of each transport stream includes two parts that respectively correspond to sub-precoding-vectors in the two polarization directions. In other words, the enhanced Type-2 port selection codebook matches a port in a dual-polarized antenna array.

However, all existing codebooks are designed for the dual-polarized antenna array. When the antenna array is a single-polarized antenna array, use of the codebook and a feedback manner in the dual-polarized antenna array is not appropriate. For example, when an antenna array is deployed in a dual-polarized manner, a channel gain in the second polarization direction usually has a fixed offset value in comparison with a channel gain in the first polarization direction. Therefore, during construction of the dual-polarized codebook, it is generally assumed that a precoding vector in the precoding matrix is represented by using one sub-vector and one offset value. A quantity of ports in one polarization direction is a half of a quantity of ports in an entire antenna array. The one sub-vector herein corresponds to a precoding vector on a port in the first polarization direction, and a product of the offset value and the foregoing one sub-vector corresponds to a precoding vector on a port in the second polarization direction. Apparently, when the antenna array is deployed in a single-polarized manner, there are no fixed offset values between the channel gain on a half of ports and the channel gain on the other half of ports. In this case, if a precoding vector in a fed-back precoding matrix is still indicated by using the one sub-vector and the one offset value, the fed-back precoding matrix no longer matches a channel feature. Consequently, a feedback error or a decrease in feedback accuracy exists.

In view of this, embodiments of this application provide a precoding matrix indicator feedback method applied to the communication system shown in FIG. 1. In the precoding matrix indicator feedback method according to an embodiment of this application, a terminal first determines a first PMI, and then sends the first PMI to an access network device. The first PMI indicates a precoding matrix W. The precoding matrix W includes R precoding vectors $w_i$, where $i=0,1,2, \ldots, R-1$. The precoding vector $w_i$ is a column vector with a length of $N_1 \times N_2 \times N_g$. $N_g$ represents a quantity of antenna panels. $N_1$ represents a quantity of ports in a first dimension on one antenna panel. $N_2$ represents a quantity of ports in a second dimension on the antenna panel. $N_1$, $N_2$, and $N_g$ are all positive integers, and at least one of $N_1$, $N_2$, and $N_g$ is greater than or equal to 2. The precoding vector $w_i$ represents a precoding vector in a polarization direction. In this case, the first PMI fed back by the terminal matches a single-polarized antenna array, and belongs to a single-polarized parameter.

With reference to FIG. 2, the following describes in detail the precoding matrix indicator feedback method 200 according to an embodiment of this application.

S201: A terminal determines a first PMI.

The first PMI indicates a precoding matrix W. The precoding matrix W includes R precoding vectors $w_i$, and $i=0,1,2, \ldots, R-1$. For example, $W=[w_0, \ldots, w_{R-1}]$. The precoding vector $w_i$ is a column vector with a length of $N_1 \times N_2 \times N_g$. $N_1$, $N_2$, and $N_g$ are all positive integers, and at least one of $N_1$, $N_2$, and $N_g$ greater than or equal to 2. $N_1$ represents a quantity of antenna ports in a first dimension on an antenna panel. $N_2$ represents a quantity of antenna ports in a second dimension on the antenna panel. The first dimension may be a horizontal dimension, or may be a vertical dimension. Correspondingly, when the first dimension is the horizontal dimension, the second dimension is the vertical dimension. When the first dimension is the vertical dimension, the second dimension is the horizontal dimension. In embodiments of this application, an example in which the first dimension is the horizontal dimension and the second dimension is the vertical dimension is used for description.

The following provides detailed designs for six types of codebooks.

(1) Type-1 Single Panel Codebook

In the Type-1 single panel codebook, two key points are described.

Key point 1: When a quantity of ports is greater than or equal to 4, the precoding matrix W reserves a precoding vector in a polarization direction. For example, the precoding vector $w_i$ is a two-dimensional DFT vector. The two-dimensional DFT vector satisfies:

$$\begin{cases} v_{l_i,m_i} = \left[u_{m_i}, u_{m_i} e^{j\frac{2\pi l_i}{O_1 N_1}}, \ldots, u_{m_i} e^{j\frac{2\pi l_i (N_1-1)}{O_1 N_1}}\right]^T \\ u_{m_i} = \left[1, e^{j\frac{2\pi m_i}{O_2 N_2}}, \ldots, e^{j\frac{2\pi m_i (N_2-1)}{O_2 N_2}}\right] \end{cases} \quad \text{Formula (7-1)}$$

$v_{l_i,m_i}$ represents the two-dimensional DFT vector. $(l_i, m_i)$ respectively represents an index of the two-dimensional DFT vector in the first dimension and an index of the two-dimensional DFT vector in the second dimension, $l_i=0, 1, \ldots, O_1N_1-1$, and $m_i=0,1, \ldots, O_2N_2-1$.

Key point 2: The first PMI is used to determine $(l_i, m_i)$.

For example, the first PMI includes a parameter $i_1$, and does not include a parameter $i_2$. The parameter $i_1$ satisfies:

$$i_1 = \begin{cases} [\,i_{1,1} \;\; i_{1,2}\,] & R=1 \\ [\,i_{1,1} \;\; i_{1,2} \;\; i_{1,3}\,] & R \geq 2 \end{cases} \quad \text{Formula (7-2)}$$

For a process of determining $(l_i, m_i)$ based on the parameter $i_1$, refer to the formula (1-3) or the formula (1-5). Details are not described herein again.

For example, that the first PMI does not include a parameter $i_2$ may also mean that CSI that includes the first PMI does not include the parameter $i_2$.

(2) Type-1 Multi-Panel Codebook

In the Type-1 multi-panel codebook, two key points are described.

Key point 1: The precoding matrix W includes $N_g$ sub-matrixes, that are $W=[W_0; \ldots; W_{N_g-1}]$, respectively corresponding to $N_g$ antenna panels. Each sub-matrix includes R precoding vectors, for example, $W_g=[w_{g,0}, \ldots, w_{N_g,R-1}]$.

In other words, the precoding matrix W includes R precoding vectors $w_i$. Each precoding vector includes $N_g$ sub-vectors, that is, the precoding vector satisfies:

$$w_i=[w_{i,0}; w_{i,1}; \ldots; w_{i,N_g-1}] \quad \text{Formula (8-1)}$$

the sub-vector $w_{i,0}$ is the $1^{st}$ sub-vector in the precoding vector $w_i$. The sub-vector $w_{i,0}$ is a two-dimensional DFT vector, and the two-dimensional DFT vector satisfies:

$$\begin{cases} v_{l_i,m_i} = \left[u_{m_i}, u_{m_i} e^{j\frac{2\pi l_i}{O_1 N_1}}, \ldots, u_{m_i} e^{j\frac{2\pi l_i (N_1-1)}{O_1 N_1}}\right]^T \\ u_{m_i} = \left[1, e^{j\frac{2\pi m_i}{O_2 N_2}}, \ldots, e^{j\frac{2\pi m_i (N_2-1)}{O_2 N_2}}\right] \end{cases} \quad \text{Formula (8-2)}$$

$v_{l_i,m_i}$ represents the two-dimensional DFT vector. $(l_i, m_i)$ respectively represents an index of the two-dimensional DFT vector in the horizontal dimension and an index of the two-dimensional DFT vector in the vertical dimension, and $l_i=0,1, \ldots, O_1N_1-1$, $m_i=0,1, \ldots, O_2N_2-1$. $O_1$ represents an oversampling factor in the horizontal dimension. $O_2$ represents an oversampling factor in the vertical dimension.

The sub-vector $w_{i,g}$ is the $(g+1)^{th}$ sub-vector in the first precoding vector $w_i$, and the sub-vector $w_{i,g}$ satisfies:

$$w_{ig}=\alpha_g w_{i,0} \quad \text{Formula (8-3)}$$

$g=1,2, \ldots, N_g-1$. $\alpha_g$ is an offset value of the $(g+1)^{th}$ sub-vector $w_{i,g}$ relative to the $1^{st}$ sub-vector $w_{i,0}$.

Key point 2: The first PMI is used to determine $(l_i, m_i)$ and an offset value $\alpha_g$.

Case 1: for the codebook mode=1, the first PMI includes the parameter $i_1$, and does not include the parameter $i_2$.

A process in which the first PMI determines $(l_i, m_i)$ specifically includes: A value of $i_1$ satisfies the formula (2-1) and the formula (2-2). In the first PMI, for a process in which $i_{1,1}$ and $i_{1,2}$ determine $(l_i, m_i)$ or a process in which $i_{1,1}$, $i_{1,2}$, and $i_{1,3}$ determine $(l_i, m_i)$, refer to the formula (1-3). Details are not described herein again.

A process in which the first PMI determines an offset value $\alpha_g$ specifically includes: the offset value $\alpha_g$ satisfies:

$$\alpha_g=\varphi_{p_i} \quad \text{Formula (8-4)}$$

$\varphi_{p_1}$ represents a phase rotation of a precoding matrix that is of a $(i+1)^{th}$ antenna panel and that is relative to a precoding matrix of a first antenna panel, and $\varphi_{p_3}$ is determined by a parameter $i_{1,4}$ in the first PMI. For details, refer to the formula (2-4), the formula (2-5) and the formula (2-6). Details are not described herein again.

For example, that the first PMI does not include a parameter $i_2$ may also mean that CSI that includes the first PMI does not include the parameter $i_2$.

Case 2: For a codebook mode=2, the first PMI includes the parameter $i_1$ and the parameter $i_2$. $i_2$ includes only a part of parameters of an existing feedback parameter $i_2$.

A process in which the first PMI determines $(l_i, m_i)$ specifically includes: A value of $i_1$ satisfies the formula (2-1). In the first PMI, for a process in which $i_{1,1}$ and $i_{1,2}$ determine $(l_i, m_i)$ or a process in which $i_{1,1}$, $i_{1,2}$, and $i_{1,3}$ determine $(l_i, m_i)$, refer to the formula (1-3). Details are not described herein again. $i_{1,4}$ and $i_2$ satisfy the following formula:

$$\begin{cases} i_{1,4}=i_{1,4,1} \\ i_2=i_{2,1} \end{cases}, \quad \text{Formula (8-5)}$$

A process in which the first PMI determines an offset value $\alpha_g$ specifically includes: the offset value $\alpha_g$ satisfies:

$$\alpha_g=a_{p_g}b_{n_g} \quad \text{Formula (8-6)}$$

$a_{p_g}b_{n_g}$ represents a rotation phase of a precoding matrix that is in a polarization direction (for example, the polarization direction A) of the $(g+1)^{th}$ antenna panel and that is relative to a precoding matrix in the polarization direction of the first antenna panel. For a calculation formula of $a_{p_g}$ and $b_{n_g}$, refer to the formula (2-9). In the first PMI, $i_{1,4,1}$ and $i_{2,1}$ are used to jointly determine the offset value $\alpha_g$. For details, refer to the descriptions of the formula (2-7), the formula (2-8), and the formula (2-9). Details are not described herein again.

For example, that the first PMI does not include a parameter $i_{1,4,2}$, $i_{2,0}$, $i_{2,2}$ may also mean that CSI that includes the first PMI does not include the parameter $i_{1,4,2}$, $i_{2,0}$, $i_{2,2}$.

(3) Type-2 Codebook

In the Type-2 codebook, two key points are described.

Key point 1: The precoding vector $w_i$ is a linear weight of S two-dimensional DFT vectors. For example, the precoding vector $w_i$ satisfies:

$$w_i=\sum_{s=0}^{S-1}\beta_{i,s}v_{l_s,m_s} \quad \text{Formula (9-1)}$$

$\beta_{i,s}$ is a combination coefficient of the precoding vector $w_i$ on the S two-dimensional DFT vectors. $v_{l_s,m_s}$ represents the $(s+1)^{th}$ two-dimensional DFT vector in the S two-dimensional DFT vectors. S is an integer of greater than or equal to 2. S may be predefined in a protocol, or may be notified to a terminal by using signaling after being determined by an access network device. The $(s+1)^{th}$ two-dimensional DFT vector $v_{l_s,m_s}$ satisfies:

$$\begin{cases} v_{l_s,m_s}=\left[u_{m_s},\, u_{m_s}e^{j\frac{2\pi l_s}{O_1N_1}},\, \ldots,\, u_{m_s}e^{j\frac{2\pi l_s(N_1-1)}{O_1N_1}}\right]^T \\ u_{m_s}=\left[1,\, e^{j\frac{2\pi m_s}{O_2N_2}},\, \ldots,\, e^{j\frac{2\pi m_s(N_2-1)}{O_2N_2}}\right] \end{cases} \quad \text{Formula (9-2)}$$

$(l_s, m_s)$ respectively represents an index of the $(s+1)^{th}$ two-dimensional DFT vector in the horizontal dimension and an index of the $(s+1)^{th}$ two-dimensional DFT vector in the vertical dimension, and $l_s=0,1, \ldots, O_1N_1-1$, $m_s=0,1, \ldots, O_2N_2-1$.

Key point 2: The first PMI is used to determine $(l_s, m_s)$ and a combination coefficient $\beta_{i,s}$. For example, the first PMI includes $i_1$ and $i_2$. A value of $i_1$ satisfies the formula (3-1), the formula (3-2), and the formula (3-3). A value of $i_2$ satisfies the formula (3-4). In addition, values of $i_{1,1}$ and $i_{1,2}$ are used to jointly determine $(l_s, m_s)$. For details, refer to the formula (3-2) or the formula (3-3). Details are not described herein again. $i_{1,3,r}$, $i_{1,4,r}$, $i_{2,2,r}$, and $i_{2,1,r}$ are reduced from 2S elements to S elements.

$i_{1,3,r}$ represents an index of strongest two-dimensional DFT vectors of the $(r+1)^{th}$ transport stream. A value range of $i_{1,3,r}$ is $[0,1, \ldots, S-1]$.

$$i_{1,4,r}=\left[k_{r,0}^{(1)}, \ldots, k_{r,S-1}^{(1)}\right]$$

represents wideband amplitude coefficients $$p_{i,l}^{(1)}$$

of precoding vectors that are of the $(r+1)^{th}$ transport stream and that are on the S two-dimensional DFT vectors. Each wideband amplitude coefficient is quantized by using three bits.

$$i_{2,2,r}=\left[k_{r,0}^{(2)}, \ldots, k_{r,S-1}^{(2)}\right]$$

represents subband amplitude coefficients $$p_{i,l}^{(2)}$$

of the precoding vectors that are of the $(r+1)^{th}$ transport stream and that are on the S two-dimensional DFT vectors. Each subband amplitude coefficient is quantized by using one bit.

$i_{2,1,r}=[c_{r,0}, \ldots, c_{r,S-1}]$ represents subband phase coefficients $\varphi_{i,l}$ of the precoding vectors that are of the $(r+1)^{th}$ transport stream and that are on the S two-dimensional DFT vectors. For example, quantization precision of each subband phase coefficient is selected from an N-PSK constellation diagram, and is determined by using the parameter $N_{PSK}$, where $N_{PSK}=4$ or $N_{PSK}=8$.

For example, the precoding vector of the $(r+1)^{th}$ transport stream satisfies:

$$w_i=\frac{1}{\sqrt{N_1N_2\sum_{l=0}^{S-1}\left(p_{i,l}^{(1)}p_{i,l}^{(2)}\right)^2}}\sum_{l=0}^{S-1}v_{l_s,m_s}p_{i,l}^{(1)}p_{i,l}^{(2)}\varphi_{i,l} \quad \text{Formula (9-3)}$$

(4) Type-2 Port Selection Codebook

In the Type-2 port selection codebook, two key points are described.

Key point 1: The precoding vector $w_i$ is a linear weight of S unit vectors. For example, the precoding vector $w_i$ satisfies:

$$w_i = \sum_{s=0}^{S-1} \beta_{i,s} v_{l_s} \qquad \text{Formula (10-1)}$$

$\beta_{i,s}$ is a combination coefficient of the precoding vector $w_i$ on the S unit vectors. $v_{l_s}$ is a column vector with a length of $N_1 \times N_2$, where the $(l_s+1)^{th}$ element is 1, and other elements are 0. $l_s$ represents an index of $v_{l_s}$ in the S unit vectors, and $l_s=0, 1, \ldots, S$. S is an integer greater than or equal to 2. S may be predefined in a protocol, or may be notified to a terminal by using signaling after being determined by an access network device.

Key point 2: The first PMI is used to determine the index $l_s$ and the combination coefficient $\beta_{i,s}$. For example, the first PMI includes $i_1$ and $i_2$. A value of $i_1$ satisfies the formula (4-1), the formula (3-2), and the formula (3-3). A value of $i_2$ satisfies the formula (3-4).

In the first PMI, a value of $i_{1,1}$ is used to determine $l_s$. For example, a portSelectionSamplingSize parameter d is first determined, where d satisfies $d \le \min\{P_{CSI\text{-}RS}, S\}$. Then, the S unit vectors are determined based on the value of $i_{1,1}$, where $i_{1,1} \in \{0, 1, \ldots, \lceil P_{CSI\text{-}RS}/d \rceil\}$. One of the S unit vectors may be denoted as $v_{i_{1,1}d+l}$, where $l=0, 1, \ldots, S-1$. $v_{i_{1,1}d+l}$ is a vector with a length of $P_{CSI\text{-}RS}/2$. In $v_{i_{1,1}d+l}$, a value of the $(i_{1,1}d+l+1)^{th}$ element is 1, and values of other elements are 0.

$i_{1,3,r}$, $i_{1,4,r}$, $i_{2,2,r}$, and $i_{2,1,r}$ are reduced from 2S elements to S elements.

$i_{1,3,r}$ represents an index of strongest unit vectors of the $(r+1)^{th}$ transport stream. A value range of $i_{1,3,r}$ is $[0, 1, \ldots, S-1]$.

$$i_{1,4,r} = \left[k_{r,0}^{(1)}, \ldots, k_{r,S-1}^{(1)}\right]$$

represents wideband amplitude coefficients $$P_{i,l}^{(1)}$$

of precoding vectors that are of the $(r+1)^{th}$ transport stream and that are on the S unit vectors. Each wideband amplitude coefficient is quantized by using three bits.

$$i_{2,2,r} = \left[k_{r,0}^{(2)}, \ldots, k_{r,S-1}^{(2)}\right]$$

represents subband amplitude coefficients $$p_{i,l}^{(2)}$$

of the precoding vectors that are of the $(r+1)^{th}$ transport stream and that are on the S unit vectors. Each subband amplitude coefficient is quantized by using one bit.

$i_{2,1,r}=[c_{r,0}, \ldots, c_{r,S-1}]$ represents subband phase coefficients $\varphi_{i,l}$ of the precoding vectors that are of the $(r+1)^{th}$ transport stream and that are on the S unit vectors. For example, quantization precision of each subband phase coefficient is selected from an N-PSK constellation diagram, and is determined by using the parameter $N_{PSK}$, where $N_{PSK}=4$, or $N_{PSK}=8$ For example, the precoding vector of the $(r+1)^{th}$ transport stream satisfies:

$$w_i = \frac{1}{\sqrt{\sum_{l=0}^{S-1}\left(p_{i,l}^{(1)} p_{i,l}^{(2)}\right)^2}} \sum_{l=0}^{S-1} v_{i_{1+1}d+l} p_{i,l}^{(1)} p_{i,l}^{(2)} \varphi_{i,l} \qquad \text{Formula (10-2)}$$

(5) Enhanced Type-2 Codebook

In the enhanced Type-2 codebook, the first PMI includes $i_1$ and $i_2$. A value of $i_1$ satisfies the formula (5-1), and a value of $i_2$ satisfies the formula (5-2). In addition, values of $i_{1,1}$ and $i_{1,2}$ are used to jointly determine S SD base vectors. For details, refer to the formula (3-2) or the formula (3-3). Details are not described herein again. $i_{1,6,r}$ and $i_{1,5}$ are used to determine an index of FD basis vectors of the $(r+1)^{th}$ transport stream. Refer to the descriptions of "A third item is a quantity $M_r$ of FD base vectors of the $(r+1)^{th}$ transport stream". Details are not described herein again.

$i_{1,7,r}$, $i_{1,8,r}$, $i_{2,4,r}$, and $i_{2,5,r}$ are reduced from 2S elements to S elements.

$i_{1,7,r}$ satisfies:

$$\begin{cases} i_{1,7,r} = \left[k_{r,0}^{(3)} \ldots k_{r,M_r-1}^{(3)}\right] \\ k_{r,f}^{(3)} = \left[k_{r,0,f}^{(3)} \ldots k_{r,2S-1,f}^{(3)}\right] \\ k_{r,l,f}^{(3)} \in \{0, 1\} \\ f = [0, 1, \ldots, M_r - 1] \end{cases} \qquad \text{Formula (11-1)}$$

$$k_{r,l,f}^{(3)}$$

indicates a position of an NZ LC coefficient corresponding to a $(f+1)^{th}$ FD base vector and a $(l+1)^{th}$ SD base vector in the $(r+1)^{th}$ transport stream. If $$k_{r,l,f}^{(3)} = 0,$$

a value of the LC coefficient at the position is 0, and a feedback is not needed. If $$k_{r,l,f}^{(3)} = 1,$$

a value of the LC coefficient at the position is non-zero, and a feedback is needed.

$i_{1,8,r}$ satisfies:

$$i_{1,8,r} = \begin{cases} \sum_{l=0}^{l_1^*} k_{1,l,0}^{(3)} - 1 & R = 1 \\ l_r^* & 1 < R \le 4 \end{cases} \quad \text{Formula (11-2)}$$

$$l_r^* \in \{0, 1, \ldots, S-1\}.$$

$i_{1,8,r}$ is used to determine a position of a strongest LC coefficient of each transport stream $$(l_r^*, f_r^*) \cdot f_r^* = 0, \text{ and } l_r^* \in \{0, 1, \ldots, S-1\}.$$

$i_{2,4,r}$ satisfies:

$$\begin{cases} i_{2,4,r} = \left[k_{r,0}^{(2)} \ \ldots \ k_{r,M_r-1}^{(2)}\right] \\ k_{r,f}^{(2)} = \left[k_{r,0,f}^{(2)} \ \ldots \ k_{r,S-1,f}^{(2)}\right] \end{cases} \quad \text{Formula (11-3)}$$

A parameter $i_{2,5,r}$ satisfies:

$$\begin{cases} i_{2,5,r} = [c_{r,0} \ \ldots \ c_{r,M_r-1}] \\ c_{r,f} = [c_{r,0,f} \ \ldots \ c_{r,S-1f}] \end{cases} \quad \text{Formula (11-4)}$$

For example, for a $(t+1)^{th}$ precoding matrix in a frequency domain, a precoding vector of the $(i+1)^{th}$ transport stream is represented as follows:

Formula (11-5)

$$w_{t,i} = \frac{1}{\sqrt{\gamma_{t,i}}} \sum_{l=0}^{S-1} v_{m_1^{(l)}, m_2^{(l)}} p_{i,0}^{(1)} \sum_{f=0}^{M_U} y_{t,i}^{(f)} p_{i,l,f}^{(2)} \varphi_{i,l,f},$$

$$\gamma_{t,i} = \sum_{l=0}^{S-1} \left(p_{i,l}^{(1)}\right)^2 \left| \sum_{f=0}^{M_U} y_{t,i}^{(f)} p_{i,l,f}^{(2)} \varphi_{i,l,f} \right|^2$$

$$y_{t,i}^{(f)} = e^{j\frac{2\pi t m_{3,i}^{(f)}}{N_3}}$$

(6) Enhanced Type-2 Port Selection Codebook

In the enhanced Type-2 port selection codebook, the first PMI includes $i_1$ and $i_2$. A value of $i_1$ satisfies the formula (6-1), and a value of $i_2$ satisfies the formula (5-2). In addition, $i_{1,1}$ is used to determine S SD unit vectors. For details, refer to the descriptions of the Type-2 port selection codebook. Details are not described herein again. $i_{1,6,r}$ and $i_{1,5}$ are used to determine an index of FD basis vectors of the $(r+1)^{th}$ transport stream. Refer to the descriptions of "A third item is a quantity $M_r$ of FD base vectors of the $(r+1)^{th}$ transport stream". Details are not described herein again.

$i_{1,7,r}$, $i_{1,8,r}$, $i_{2,4,r}$, and $i_{2,5,r}$ are reduced from 2S elements to S elements.

$i_{1,7,r}$ satisfies:

$$\begin{cases} i_{1,7,r} = \left[k_{r,0}^{(3)} \ \ldots \ k_{r,M_r-1}^{(3)}\right] \\ k_{r,f}^{(3)} = \left[k_{r,0,f}^{(3)} \ \ldots \ k_{r,S-1,f}^{(3)}\right] \\ \quad k_{r,l,f}^{(3)} \in \{0, 1\} \\ f = [0, 1, \ldots, M_r - 1] \end{cases} \quad \text{Formula (12-1)}$$

$$k_{r,l,f}^{(3)}$$

indicates a position of an NZ LC coefficient corresponding to a $(f+1)^{th}$ FD base vector and a $(l+1)^{th}$ SD base vector in the $(r+1)^{th}$ transport stream. If $$k_{r,l,f}^{(3)} = 0,$$

a feedback of the NZ LC coefficient at the position is not needed. If $$k_{r,l,f}^{(3)} = 1,$$

a feedback of the NZ LC coefficient at the position is needed.

For $i_{1,8,r}$, refer to the descriptions of the formula (11-2), and details are not described herein again.

$i_{2,4,r}$ satisfies:

$$\begin{cases} i_{2,4,r} = \left[k_{r,0}^{(2)} \ \ldots \ k_{r,M_r-1}^{(2)}\right] \\ k_{r,f}^{(2)} = \left[k_{r,0,f}^{(2)} \ \ldots \ k_{r,S-1,f}^{(2)}\right] \end{cases} \quad \text{Formula (12-2)}$$

The parameter $i_{2,5,r}$ satisfies:

$$\begin{cases} i_{2,5,r} = [c_{r,0} \ \ldots \ c_{r,M_r-1}] \\ c_{r,f} = [c_{r,0,f} \ \ldots \ c_{r,S-1,f}] \end{cases} \quad \text{Formula (12-3)}$$

For example, for the $((t+1))^{th}$ precoding matrix in a frequency domain, a precoding vector of the $((r+1))^{th}$ transport stream is represented as follows:

$$w_{t,i} = \frac{1}{\sqrt{\gamma_{t,i}}} \sum_{l=1}^{S-1} v_{i_{1,1}d+l} \, p_{i,0}^{(1)} \sum_{f=0}^{M_r} y_{t,i}^{(f)} p_{i,l,f}^{(2)} \varphi_{i,l,f} \quad \text{Formula (12-4)}$$

$$\gamma_{t,i} = \sum_{l=0}^{S-1} \left(p_{i,l}^{(1)}\right)^2 \left| \sum_{f=0}^{M_r} y_{t,i}^{(f)} p_{i,l,f}^{(2)} \varphi_{i,l,f} \right|^2,$$

and $$y_{t,i}^{(f)} = e^{j\frac{2\pi t n_{3,i}^{(f)}}{N_3}}.$$

The foregoing uses six types of codebooks as examples to describe the first PMI that matches a single-polarized antenna port.

For example, before the terminal determines the first PMI, RS measurement is performed to determine a channel measurement result and an interference measurement result (or determine a channel measurement result and a noise measurement result). The terminal determines the first PMI based on the channel measurement result and the interference measurement result (or the channel measurement result and the noise measurement result).

For example, before the terminal determines the first PMI, the terminal first determines a codebook type. The terminal determines the first PMI based on the codebook type. For example, when the codebook type is a Type-1 single panel codebook, the terminal determines a precoding matrix based on the foregoing descriptions of the Type-1 single panel codebook. For determining of the codebook type, refer to descriptions of PMI feedback configuration information in S205. Details are not described herein.

In some embodiments, the first PMI is carried in a first CSI report. The first CSI report does not include a second PMI. The first PMI and the second PMI jointly indicate a precoding matrix $W_{dual}$. The precoding matrix $W_{dual}$ includes R precoding vectors $w_{dual,i}=[w_i, \tilde{w}_i]$, and i=0, 1,2, . . . , R−1. The precoding vectors $w_i$ and $\tilde{w}_i$ are column vectors with the length of $N_1 \times N_2 \times N_g$. The precoding vector $w_i$ represents a precoding vector in a first polarization direction. The precoding vector $\tilde{w}_i$ represents a precoding vector in a second polarization direction. In other words, the first CSI report corresponds to one piece of CSI. The piece of CSI includes the first PMI, and does not include the second PMI. The second PMI is described as follows: the second PMI includes a parameter used to determine the precoding matrix. For example, when the codebook is the Type-1 single panel codebook, the second PMI includes the parameter $i_2$. The precoding matrix $W_{dual}$ jointly indicated by the first PMI and the second PMI is shown in Table 1-1 or Table 1-2. Alternatively, when the codebook is the codebook mode 1 of the Type-1 multi-panel codebook, the second PMI includes the parameter $i_2$. The precoding matrix $W_{dual}$ jointly indicated by the first PMI and the second PMI is shown in Table 2-1. It should be understood that the codebook may be further implemented as the Type-2 codebook, the Type-2 port selection codebook, the enhanced Type-2 codebook, or the enhanced Type-2 port selection codebook. A case in which the first PMI and the second PMI jointly indicate the precoding matrix $W_{dual}$ is not listed one by one herein.

S202: The terminal sends the first PMI to the access network device. Correspondingly, the access network device receives the first PMI from the terminal.

For example, the first PMI is carried in the first CSI report. The terminal sends the first CSI report carrying the first PMI to the access network device. Correspondingly, the access network device receives the first CSI report carrying the first PMI from the terminal. Optionally, the first CSI report further includes a first RI and a first CQI. The first RI, the first PMI, and the first CQI correspond to one channel/interference measurement result.

For another example, the terminal sends the first PMI to the access network device on a PUCCH (or a PUSCH). Correspondingly, the access network device receives the first PMI from the terminal on the PUCCH (or the PUSCH). All parameters in the first PMI may be jointly fed back. To be specific, after bit information of all the parameters in the first PMI are connected in series, channel coding and transmission is performed. Alternatively, all parameters in the first PMI may be independently fed back. For example, when the first PMI includes $i_1$ and $i_2$, channel coding and transmission are separately performed on $i_1$ and $i_2$.

S203: The access network device performs precoding based on the precoding matrix W indicated by the first PMI.

For example, when the access network device determines to transmit downlink data by using the single-polarized antenna array, the access network device restores the precoding matrix W based on the first PMI, and performs precoding on the to-be-transmitted data with reference to the precoding matrix W.

In the precoding matrix indicator feedback method 200 according to an embodiment of this application, the precoding matrix W indicated by the first PMI includes R precoding vectors $w_i$, and the precoding vector $w_i$ is a column vector with a length of $N_1 \times N_2 \times N_g$. In other words, the precoding matrix W indicated by the first PMI includes a precoding vector in a polarization direction, and matches an antenna array in a single-polarized design. In this way, the terminal can feed back, to the access network device, the first PMI that matches the single-polarized antenna array.

In some embodiments, as shown in FIG. 2, the precoding matrix indicator feedback method 200 according to an embodiment of this application may further include S204 or S205.

S204: The access network device sends first configuration information to the terminal. Correspondingly, the terminal receives the first configuration information from the access network device.

The first configuration information indicates that a quantity of ports of an RS is $N_1 \times N_2 \times N_g$. The measurement result of the RS is used to determine the first PMI.

For example, the first configuration information may be reference signal configuration information. The reference signal configuration information is associated with CSI report configuration information.

In other words, the first configuration information indicates a single-polarized PMI feedback manner by indicating an RS port configuration. In this case, the terminal provides the first PMI determined based on the single-polarized PMI feedback manner.

S205: The access network device sends first indication information to the terminal. Correspondingly, the terminal receives the first indication information from the access network device.

The first indication information indicates the single-polarized PMI feedback manner. The single-polarized PMI feedback manner indicated by the first indication information is used to determine the first PMI.

For example, the first indication information may be an information element in codebook configuration information. The codebook configuration information is carried in the CSI report configuration information.

In other words, the first indication information clearly indicates the single-polarized PMI feedback manner. After the terminal determines a single-polarized first PMI, the terminal feeds back the single-polarized first PMI to the access network device.

It should be noted that S204 and S205 are optional steps, as shown in two dashed-line boxes in FIG. 2. When the terminal can feed back both a PMI that matches a dual-polarized antenna array and a PMI that matches the single-polarized antenna array, the terminal may perform S204 before performing S201. In this case, the terminal does not perform S205. Alternatively, the terminal may perform S205 before performing S201. In this case, the terminal does not perform S204. It should be understood that, when the terminal performs S205, the quantity of ports of the reference signal may be $N_1 \times N_2 \times N_g$, and may also be $2 \times N_1 \times N_2 \times N_g$. This is not limited by embodiments of this application.

In addition, the CSI report configuration information (or the reference signal configuration information) further includes the PMI feedback configuration information. The PMI feedback configuration information may include the following three items:

A first item is antenna port deployment information. For example, the first item may include a quantity of antenna panels $N_g$, a quantity $N_1$ of H-dimensional ports on each antenna panel, a quantity $N_2$ of V-dimensional ports on each antenna panel, an H-dimensional oversampling factor $O_1$ during precoding matrix construction, and a V-dimensional oversampling factor $O_2$ during precoding matrix construction, and the like.

A second item is a deployment manner of the antenna panel. For example, the second item may be represented as $N_{g,H} \times N_{g,v} \cdot N_{g,H}$ is a quantity of antenna panels in the horizontal dimension, and $N_{g,V}$ represents a quantity of antenna panels in the vertical dimension. For example, when there are four antenna panels, the deployment manner may be deployed in a horizontal deployment manner of 4*1, a vertical deployment manner of 1*4, or a rectangular deployment manner of 2*2.

A third item indicates a port polarization deployment manner. For example, the third item may indicate whether a port is deployed in a single-polarized manner or deployed in a dual-polarized manner. Further, when the port is deployed in dual-polarized mode, two polarization directions may be indicated, for example, the two polarization directions are (0, 90°) or (+45, −45°) respectively.

Optionally, the PMI feedback configuration information further includes the codebook configuration information. The codebook configuration information indicates the codebook type. For example, the codebook configuration information may indicate the Type-1 single panel codebook, the Type-1 multi-panel codebook, the Type-2 codebook, the Type-2 port selection codebook, the enhanced Type-2 codebook, or the enhanced Type-2 port selection codebook.

Optionally, the PMI feedback information further includes base vector quantity information.

In some embodiments, the CSI report configuration information further includes third indication information. The third indication information indicates a dual-polarized PMI feedback manner. The dual-polarized PMI feedback manner indicated by the third indication information is used to feed back a third PMI. In other words, the access network device includes two pieces of indication information, that is first indication information and third indication information, in a same piece of CSI report configuration information, to indicate that the terminal feeds back both the first PMI that matches the single-polarized antenna array and the third PMI that matches the dual-polarized antenna array in a same CSI report. For details, refer to descriptions in S205. Details are not described herein.

In some embodiments, as shown in FIG. 2, when S205 is performed, the precoding matrix indicator feedback method 200 according to an embodiment of this application may further include S206.

S206: The access network device sends second indication information to the terminal. Correspondingly, the terminal receives the second indication information from the access network device.

The second indication information indicates the polarization direction. The polarization direction indicated by the second indication information is used to determine the first PMI.

For example, when the reference signal is deployed on a dual-polarized port, the second indication information may be active pattern set configuration information. The active pattern set configuration information indicates port activation states in the H dimension, the V dimension, and a polarization dimension.

For example, when the reference signal is a single panel reference signal, the active pattern set configuration information is indicated by using a three-dimensional bitmap matrix. For example, the three-dimensional bitmap matrix satisfies:

$$\begin{cases} C = [C_{x,y,z}] \\ x = 0, 1, \dots, N_1 - 1 \\ x = 0, 1, \dots, N_1 - 1 \\ p = 0, 1 \end{cases} \quad \text{Formula (13-1)}$$

C represents the three-dimensional bitmap matrix. $C_{x,y,z}$ represents port activation states in the $(x+1)^{th}$ row, the $(y+1)^{th}$ column, and the $(p+1)^{th}$ polarization direction. For example, $C_{x,y,z}=1$ represents an activated state, and $C_{x,y,z}=0$ represents a deactivated state. Alternatively, on the contrary, $C_{x,y,z}=1$ represents the deactivated state, and $C_{x,y,z}=0$ represents the activated state. In an example in which $C_{x,y,z}=1$ represents the activated state, the second indication information includes $C_{x,y,0}=1$, to indicate an activated port in the first polarization direction. The terminal needs to feed back the first PMI that matches the first polarization direction. Alternatively, the second indication information includes $C_{x,y,1}=1$, to indicate an activated port in the second polarization direction. The terminal needs to feed back the first PMI that matches the second polarization direction. For example, the first polarization direction may be the polarization direction A, and the second polarization direction may be the polarization direction B. Alternatively, the first polarization direction may be the foregoing polarization direction B, and the second polarization direction may be the foregoing polarization direction A.

When the reference signal is a multi-panel reference signal, the active pattern set configuration information is indicated by using a four-dimensional bitmap matrix. For example, the four-dimensional bitmap matrix satisfies:

$$\begin{cases} D = [D_{g,x,y,z}] \\ g = 1, 2, \dots, N_g - 1 \\ x = 0, 1, \dots, N_1 - 1 \\ y = 0, 1, \dots, N_1 - 1 \\ p = 0, 1 \end{cases} \quad \text{Formula (13-2)}$$

D represents the four-dimensional bitmap matrix. $D_{g,x,y,z}$ represents port activation states in the $(g+1)^{th}$ antenna panel, the $(x+1)^{th}$ row, the $(y+1)^{th}$ column, and the $(p+1)^{th}$ polarization direction. For example, $D_{g,x,y,z}=1$ represents an activated state, and $D_{g,x,y,z}=0$ represents a deactivated state. Alternatively, on the contrary, $D_{g,x,y,z}=1$ represents the deactivated state, and $D_{g,x,y,z}=0$ represents the activated state. In an example in which $D_{g,x,y,z}=1$ represents the activated state, the second indication information includes $D_{g,x,y,0}=1$, to indicate an activated port in the first polarization direction of the $(g+1)^{th}$ antenna panel. The terminal needs to feed back the first PMI that matches the first polarization direction. Alternatively, the second indication information includes $D_{g,x,y,1}=1$, to indicate an activated port in the second polarization direction of the $(g+1)^{th}$ antenna panel. The terminal needs to feed back the first PMI that matches the second polarization direction.

It should be noted that S206 is an optional step. For example, when the terminal is defaulted to feed back a PMI that matches a polarization direction, the terminal may not perform S206, but perform S201. The polarization direction that is fed back by default may be predefined in a protocol, for example, the polarization direction A or the polarization direction B. For another example, when the terminal can feed back both a PMI that matches the polarization direction A, and a PMI that matches the polarization direction B, the terminal may perform S206 before performing S201. For example, when the quantity of ports of the reference signal is $2\times N_1\times N_2\times N_g$, the terminal performs S206 before performing S201.

It should be understood that, when the terminal performs S205 and S206, the terminal may perform S205 before performing S206, or may perform S206 before performing S205, or may simultaneously perform S205 and S206. Further, when the terminal simultaneously performs S205 and S206, the first indication information and the second indication information may be carried in a same message, or may be carried in different messages. This is not limited in embodiments of this application.

In some embodiments, the precoding matrix indicator feedback method 200 according to an embodiment of this application may further include the following step: The terminal sends the third PMI to the access network device. Correspondingly, the access network device receives the third PMI from the terminal.

The third PMI indicates a precoding matrix $$W'_{dual}.$$

The precoding matrix $$W'_{dual}$$

includes $$R'_{dual}$$

precoding vectors $$w'_{dual,i},$$

and $$i = 0, 1, 2, \ldots, R'_{dual} - 1.$$

The precoding vector $$w'_{dual,i}$$

is a column vector with a length of $2\times N_1\times N_2\times N_g$. For example, when the codebook is the Type-1 single panel codebook, the third PMI includes the parameters $i_1$ and $i_2$. A precoding matrix $$W'_{dual}$$

indicated by the third PMI is shown in Table 1-1 or Table 1-2. For details, refer to the descriptions of the Type-1 single panel codebook in the term explanation part. It should be understood that the codebook may be further implemented as the Type-1 multi-panel codebook, the Type-2 codebook, the Type-2 port selection codebook, the enhanced Type-2 codebook, or the enhanced Type-2 port selection codebook. Cases of the third PMI and cases in which the third PMI indicates the precoding matrix $$W'_{dual}$$

are not listed one by one. For details, refer to descriptions of the codebook in the term explanation part. Details are not described herein again.

The third PMI and the first PMI belong to different CSI. This may be specifically understood as follows: The precoding matrix indicated by the third PMI and the precoding matrix indicated by the first PMI correspond to different downlink frequency domain resources.

For example, the third PMI and the first PMI may be carried in different CSI reports. For example, when one CSI report corresponds to one port activation pattern, or one CSI report corresponds to one piece of CSI, a CSI report carrying the third PMI and a CSI report carrying the first PMI are different.

Alternatively, the third PMI and the first PMI may also be carried in a same CSI report. For example, when one CSI report corresponds to at least two port activation patterns, or one CSI report corresponds to one piece of CSI, a CSI report carrying the third PMI and a CSI report carrying the first PMI are the same. The same CSI report carries both the first PMI that matches the single-polarized antenna array and the third PMI that matches the dual-polarized antenna array, to reduce signaling overheads.

It is easy to understand that, when the access network device determines to transmit the downlink data by using the dual-polarized antenna array, after the access network device receives the third PMI, the access network device performs precoding processing based on the precoding matrix $$W'_{dual}$$

indicated by the third PMI.

In various embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

It may be understood that to implement functions in the foregoing embodiments, the base station and the terminal include corresponding hardware structures and/or software modules for performing various functions. A person skilled in the art should be easily aware that, in combination with the units and the method steps in the examples described in embodiments disclosed in this application, this application can be implemented by using hardware or a combination of hardware and computer software. Whether a function is performed by using hardware or hardware driven by computer software depends on a particular application scenario and design constraint of the technical solutions.

Figure 4:
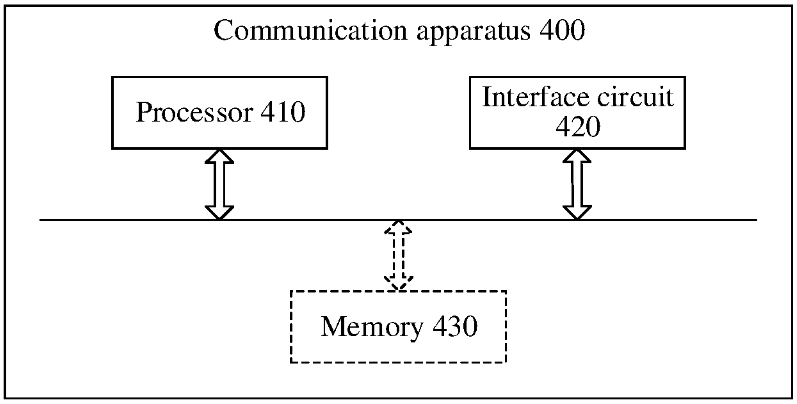
FIG. 4 is a schematic diagram of a structure of another communication apparatus according to an embodiment of this application.

FIG. 3 and FIG. 4 are schematic diagrams of structures of possible communication apparatuses according to embodiments of this application. The communication apparatus may be configured to implement functions of the terminal or the access network device in the foregoing method embodiments. Therefore, beneficial effects of the foregoing method embodiments can also be achieved. In embodiments of this application, the communication apparatus may be one of the terminals 120*a* to 120*j* shown in FIG. 1, or may be the access network device 110*a* or 110*b* shown in FIG. 1, or may be a module (such as a chip) used in the terminal or the access network device.

As shown in FIG. 3, a communication apparatus 300 includes a processing unit 310 and a transceiver unit 320. The communication apparatus 300 is configured to implement a function of the terminal or the access network device according to the method embodiment shown in FIG. 2.

When the communication apparatus 300 is configured to implement a function of the terminal in a method embodiment shown in FIG. 2, the transceiver unit 320 is configured to perform S202, S204, S205, and S206. The processing unit 310 is configured to perform S201.

When the communication apparatus 300 is configured to implement the function of the access network device in a method embodiment shown in FIG. 2, the transceiver unit 320 is configured to perform S202, S204, S205, and S206. The processing unit 310 is configured to perform S203.

For more detailed descriptions of the processing unit 310 and the transceiver unit 320, directly refer to related descriptions of the method embodiment shown in FIG. 2. Details are not described herein again.

All related content of the steps in the foregoing method embodiments may be cited in function descriptions of the corresponding functional modules. Details are not described herein again.

As shown in FIG. 4, a communication apparatus 400 includes a processor 410 and an interface circuit 420. The processor 410 and the interface circuit 420 are coupled to each other. It may be understood that the interface circuit 420 may be a transceiver or an input/output interface. Optionally, the communication apparatus 400 may further include a memory 430, configured to store instructions to be executed by the processor 410, store input data required for running the instructions by the processor 410, or store data generated after the processor 410 runs the instructions.

When the communication apparatus 400 is configured to implement the method shown in FIG. 2, the processor 410 is configured to perform a function of the processing unit 310. The interface circuit 420 is configured to perform a function of the transceiver unit 320.

When the foregoing communication apparatus is a chip used in the terminal, the terminal chip implements a function of the terminal in the foregoing method embodiments. The terminal chip receives information from another module (for example, a radio frequency module or an antenna) in the terminal. The information is sent by the access network device to the terminal. Alternatively, the chip in the terminal sends information to another module (for example, a radio frequency module or an antenna) in the terminal. The information is sent by the terminal to the access network device.

When the communication apparatus is a module used in the access network device, the module in the access network device implements a function of the access network device in the foregoing method embodiments. The module in the access network device receives information from another module (for example, the radio frequency module or the antenna) in the access network device. The information is sent by the terminal device to the access network device. Alternatively, the module in the access network device sends information to another module (for example, the radio frequency module or the antenna) in the access network device. The information is sent by the access network device to a terminal device. The access network device module herein may be a baseband chip of the access network device, or may be a DU or another module. The DU herein may be a DU in an open radio access network (O-RAN) architecture.

It can be understood that the processor in embodiments of this application may be a central processing unit (CPU), or may be another general-purpose processor, a digital signal processor (DSP), an application-specific integrated circuit (ASIC), a field programmable gate array (FPGA) or another programmable logic device, a transistor logic device, a hardware component, or any combination thereof. The general purpose processor may be a microprocessor or any regular processor or the like.

The method steps in embodiments of this application may be implemented in a hardware manner, or may be implemented in a manner of executing software instructions by the processor. The software instructions may include a corresponding software module. The software module may be stored in a random access memory, a flash memory, a read-only memory, a programmable read-only memory, an erasable programmable read-only memory, an electrically erasable programmable read-only memory, a register, a hard disk, a removable hard disk, a CD-ROM, or any other form of storage medium well-known in the art. For example, a storage medium is coupled to a processor, so that the processor can read information from the storage medium and write information into the storage medium. Certainly, the storage medium may be a component of the processor. The processor and the storage medium may be disposed in an ASIC. In addition, the ASIC may be located in an access network device or a terminal. Certainly, the processor and the storage medium may exist in the access network device or the terminal as discrete components.

All or some of the foregoing embodiments may be implemented by using software, hardware, firmware, or any combination thereof. When software is used to implement the foregoing embodiments, all or some of the foregoing embodiments may be implemented in a form of a computer program product. The computer program product includes one or more computer programs and instructions. When the computer programs or instructions are loaded and executed on a computer, all or some of the procedures or functions in embodiments of this application are performed. The computer may be a general-purpose computer, a dedicated computer, a computer network, a network device, user equipment, or another programmable apparatus. The computer programs or instructions may be stored in a computer-readable storage medium, or may be transmitted from a computer-readable storage medium to another computer-readable storage medium. For example, the computer programs or instructions may be transmitted from a website, computer, server, or data center to another website, computer, server, or data center in a wired manner or in a wireless manner. The computer-readable storage medium may be any usable medium that can be accessed by the computer, or a data storage device, such as a server or a data center, integrating one or more usable media. The usable medium may be a magnetic medium, for example, a floppy disk, a hard disk, or a magnetic tape; or may be an optical medium, for example, a digital video disc; or may be a semiconductor medium, for example, a solid-state drive. The computer-readable storage medium may be a volatile or nonvolatile storage medium, or may include two types of storage media: a volatile storage medium and a non-volatile storage medium.

In various embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

In this application, "at least one" refers to one or more. "And/or" is an association relationship for describing associated objects, and indicates that three relationships may exist. For example, A and/or B may indicate the following cases: Only A exists, both A and B exist, and only B exists, where A and B may be in a singular form or a plural form. In a formula of this application, the character "/" indicates a "division" relationship between associated objects. "Including at least one of A, B, and C" may represent: including A; including B; including C; including A and B; including A and C; including B and C; and including A, B, and C.

It may be understood that various numbers in embodiments of this application are merely used for differentiation for ease of description, and are not used to limit the scope of embodiments of this application. The sequence numbers of the foregoing processes do not mean execution sequences, and the execution sequences of the processes should be determined based on functions and internal logic of the processes.

What is claimed is:

1. A method comprising:

determining a first precoding matrix indicator (PMI), wherein the first PMI indicates a precoding matrix W, the precoding matrix W comprises R precoding vectors $w_i$, i=0,1,2, . . . , R−1, the precoding vector $w_i$ is a column vector with a length of $N_1 \times N_2 \times N_g$, $N_g$ represents a quantity of antenna panels, $N_1$ represents a quantity of ports in a first dimension on one antenna panel of the antenna panels, $N_2$ represents a quantity of ports in a second dimension on the antenna panel of the antenna panels, $N_1$, $N_2$, and $N_g$ are all positive integers, and at least one of $N_1$, $N_2$, and $N_g$ is greater than or equal to 2; and sending the first PMI.

2. The method according to claim 1, wherein the method further comprises:

receiving first indication information, wherein the first indication information indicates a single-polarized PMI feedback manner, and the single-polarized PMI feedback manner is used to determine the first PMI.

3. The method according to claim 2, further comprises:

receiving second indication information, wherein the second indication information indicates a polarization direction, and the polarization direction is used to determine the first PMI.

4. The method according to claim 1, wherein $N_g$=1, each precoding vector $w_i$ is a two-dimensional discrete Fourier transform (DFT) vector, and the two-dimensional DFT vector satisfies:

$$\begin{cases} v_{l_i,m_i} = \left[u_{m_i},\ u_{m_i} e^{j\frac{2\pi l_i}{O_1 N_1}},\ \ldots,\ u_{m_i} e^{j\frac{2\pi l_i (N_1-1)}{O_1 N_1}}\right]^T \\ u_{m_i} = \left[1,\ e^{j\frac{2\pi m_i}{O_2 N_2}},\ \ldots,\ e^{j\frac{2\pi m_i (N_2-1)}{O_2 N_2}}\right] \end{cases},$$

wherein $v_{l_i,m_i}$ represents the two-dimensional DFT vector; ($l_i$, $m_i$) respectively represents an index of the two-dimensional DFT vector in the first dimension and an index of the two-dimensional DFT vector in the second dimension, $l_i$=0,1, . . . , $O_1N_1$−1, and $m_i$=0,1, . . . , $O_2N_2$−1; $O_1$ represents an oversampling factor in the first dimension; and $O_2$ represents an oversampling factor in the second dimension, wherein the first PMI is used to determine ($l_i$, $m_i$).

5. The method according to claim 1, wherein $N_g$>1, and the precoding vector $w_i$ satisfies:

$w_i \leq [w_{i,0}; w_{i,1}; \ldots ; w_{i,N_g-1}]$, wherein each sub-vector $w_{i,0}$ is the 1st sub-vector in the precoding vector $w_i$; and each sub-vector $w_{i,0}$ is a two-dimensional discrete Fourier transform (DFT) vector, and each two-dimensional DFT vector satisfies:

$$\begin{cases} v_{l_i,m_i} = \left[u_{m_i},\ u_{m_i} e^{j\frac{2\pi l_i}{O_1 N_1}},\ \ldots,\ u_{m_i} e^{j\frac{2\pi l_i (N_1-1)}{O_1 N_1}}\right]^T \\ u_{m_i} = \left[1,\ e^{j\frac{2\pi m_i}{O_2 N_2}},\ \ldots,\ e^{j\frac{2\pi m_i (N_2-1)}{O_2 N_2}}\right] \end{cases},$$

wherein $v_{l_i,m_i}$ represents the two-dimensional DFT vector, ($l_i$, $m_i$) respectively represents an index of the two-dimensional DFT vector in the first dimension and an index of the two-dimensional DFT vector in the second dimension, $l_i$=0,1, . . . , $O_1N_1$−1, and $m_i$=0,1, . . . , $O_2N_2$−1; $O_1$ represents an oversampling factor in the first dimension; and $O_2$ represents an oversampling factor in the second dimension; and the sub-vector $w_{i,g}$ is the $(g+1)^{th}$ sub-vector in the precoding vector $w_i$, and the sub-vector $w_{i,g}$ satisfies:

$w_{i,g} = \alpha_g w_{i,0}$, wherein g=1,2, . . . , $N_g$−1, and $\alpha_g$ is an offset value of the $(g+1)^{th}$ sub-vector $w_{i,g}$ relative to the corresponding $1^{st}$ sub-vector $w_{i,0}$, wherein the first PMI is used to determine ($l_i$, $m_i$) and the offset value $\alpha_g$.

6. The method according to claim 1, wherein the first PMI is carried in a first channel state information (CSI) report, the first CSI report does not comprise a second PMI, the second PMI and the first PMI jointly indicate a precoding matrix $W_{dual}$, the precoding matrix $W_{dual}$ comprises R precoding vectors w_(dual,i), w_(dual,i)=[$w_i$, $\tilde{w}_i$], and i=0,1,2, . . . , R−1, wherein the precoding vectors $w_i$ and $\tilde{w}_i$ are column vectors with a length of $N_1 \times N_2 \times N_g$, each precoding vector $w_i$ represents a precoding vector in a first polarization direction, and each precoding vector $\tilde{w}_i$ represents a precoding vector in a second polarization direction.

7. The method according to claim 1, wherein the first PMI is carried in a first channel state information (CSI) report, the first PMI is a single-polarized PMI, the first CSI report further comprises a third PMI, the third PMI is a dual-polarized PMI, the third PMI indicates a precoding matrix $$W'_{dual},$$

the precoding matrix $$W'_{dual}$$

comprises $$R'_{dual}$$

precoding vectors $$w'_{dual,i},\ i = 0, 1, 2, \ldots, R'_{dual} - 1,$$

and each precoding vector $$w'_{dual,i}$$

is a column vector with a length of $2 \times N_1 \times N_2 \times N_g$.

8. An apparatus comprising:

at least one processor coupled to one or more memories storing programming instructions that for execution by the at least one processor to perform operations comprising:

determining a first precoding matrix indicator (PMI), wherein the first PMI indicates a precoding matrix W, the precoding matrix W comprises R precoding vectors $w_i$, i=0,1,2, . . . , R−1, the precoding vector $w_i$ is a column vector with a length of $N_1 \times N_2 \times N_g$, $N_g$ represents a quantity of antenna panels of an access network devic, $N_1$ represents a quantity of ports in a first dimension on an antenna panel of the antenna panels, $N_2$ represents a quantity of ports in a second dimension on the antenna panel of the antenna panels, $N_1$, $N_2$, and $N_g$ are all positive integers, and at least one of $N_1$, $N_2$, and $N_g$ is greater than or equal to 2; and sending the first PMI.

9. The apparatus according to claim 8, wherein the operations further comprises:

receiving first indication information, wherein the first indication information indicates a single-polarized PMI feedback manner, and the single-polarized PMI feedback manner is used to determine the first PMI.

10. The apparatus according to claim 9, wherein the operations further comprises:

receiving second indication information, wherein the second indication information indicates a polarization direction, and the polarization direction is further used to determine the first PMI.

11. The apparatus according to claim 8, wherein $N_g=1$, each precoding vector $w_i$ is a two-dimensional discrete Fourier transform (DFT) vector, and each two-dimensional DFT vector satisfies:

$$\begin{cases} v_{l_i,m_i} = \left[u_{m_i}, u_{m_i} e^{j\frac{2\pi l_i}{O_1 N_1}}, \ldots, u_{m_i} e^{j\frac{2\pi l_i (N_1-1)}{O_1 N_1}}\right]^T \\ u_{m_i} = \left[1, e^{j\frac{2\pi m_i}{O_2 N_2}}, \ldots, e^{j\frac{2\pi m_i (N_2-1)}{O_2 N_2}}\right] \end{cases},$$

wherein $v_{l_i,m_i}$ represents the two-dimensional DFT vector; $(l_i, m_i)$ respectively represents an index of the two-dimensional DFT vector in the first dimension and an index of the two-dimensional DFT vector in the second dimension, $l_i$=0,1, . . . , $O_1N_1-1$, and $m_i$=0,1, . . . , $O_2N_2-1$; $O_1$ represents an oversampling factor in the first dimension; and $O_2$ represents an oversampling factor in the second dimension, wherein the first PMI is used to determine $(l_i, m_i)$.

12. The apparatus according to claim 8, wherein $N_g>1$, and the precoding vector $w_i$ satisfies:

$w_i=[w_{i,0}; w_{i,1}; \ldots ; w_{i,N_g-1}]$, wherein each sub-vector $w_{i,0}$ is the 1st sub-vector in the precoding vector $w_i$; and each sub-vector $w_{i,0}$ is a two-dimensional discrete Fourier transform (DFT) vector, and each two-dimensional DFT vector satisfies:

$$\begin{cases} v_{l_i,m_i} = \left[u_{m_i}, u_{m_i} e^{j\frac{2\pi l_i}{O_1 N_1}}, \ldots, u_{m_i} e^{j\frac{2\pi l_i (N_1-1)}{O_1 N_1}}\right]^T \\ u_{m_i} = \left[1, e^{j\frac{2\pi m_i}{O_2 N_2}}, \ldots, e^{j\frac{2\pi m_i (N_2-1)}{O_2 N_2}}\right] \end{cases},$$

wherein $v_{l_i,m_i}$ represents the two-dimensional DFT vector, $(l_i, m_i)$ respectively represents an index of the two-dimensional DFT vector in the first dimension and an index of the corresponding two-dimensional DFT vector in the second dimension, $l_i$=0,1, . . . , $O_1N_1-1$, and $m_i$=0,1, . . . , $O_2N_2-1$; $O_1$ represents an oversampling factor in the first dimension; and $O_2$ represents an oversampling factor in the second dimension; and each sub-vector $w_{i,g}$ is the $(g+1)^{th}$ sub-vector in the precoding vector $w_i$, and each sub-vector $w_{i,g}$ satisfies:

$w_{i,g}=\alpha_g w_{i,0}$, wherein g=1,2, . . . , $N_g-1$, and $\alpha_g$ is an offset value of the $(g+1)^{th}$ sub-vector $w_{i,g}$ relative to the 1st sub-vector $w_{i,0}$, wherein the first PMI is used to determine $(l_i, m_i)$ and the offset value $\alpha_g$.

13. The apparatus according to claim 8, wherein the first PMI is carried in a first channel state information (CSI) report, the first CSI report does not comprise a second PMI, the second PMI and the first PMI jointly indicate a precoding matrix $W_{dual}$, the precoding matrix $W_{dual}$ comprises R precoding vectors w_(dual,i), w_(dual,i)=$[w_i, \tilde{w}_i]$, and i=0, 1,2, . . . , R−1, wherein the precoding vectors $w_i$ and $\tilde{w}_i$ are column vectors with a length of $N_1 \times N_2 \times N_g$, each precoding vector $w_i$ represents a precoding vector in a first polarization direction, and each precoding vector $\tilde{w}_i$ represents a precoding vector in a second polarization direction.

14. The apparatus according to claim 8, wherein the first PMI is carried in a first channel state information (CSI) report, the first PMI is a single-polarized PMI, the first CSI report further comprises a third PMI, the third PMI is a dual-polarized PMI, the third PMI indicates a precoding matrix $$W'_{dual},$$

the precoding matrix $$W'_{dual}$$

comprises $$R'_{dual}$$

precoding vectors $$w'_{dual,i},\ i = 0, 1, 2, \ldots, R'_{dual} - 1,$$

and each precoding vector $$w'_{dual,i}$$

is a column vector with a length of $2\times N_1\times N_2\times N_g$.

15. An apparatus comprising:

at least one processor coupled to one or more memories storing programming instructions for execution by the at least one processor to perform operations comprising:

receiving a first precoding matrix indicator (PMI), wherein the first PMI indicates a precoding matrix W, the precoding matrix W comprises R precoding vectors $w_i$, i=0,1,2, . . . , R−1, the precoding vector $w_i$ is a column vector with a length of $N_1\times N_2\times N_g$, $N_g$ represents a quantity of antenna panels of an access network device, $N_1$ represents a quantity of ports in a first dimension on one antenna panel, $N_2$ represents a quantity of ports in a second dimension on the antenna panel, $N_1$, $N_2$, and $N_g$ are all positive integers, and at least one of $N_1$, $N_2$, and $N_g$ is greater than or equal to 2; and performing precoding based on the precoding matrix W indicated by the first PMI.

16. The apparatus according to claim 15, wherein the operations further comprises:

sending first indication information, wherein the first indication information indicates to use a single-polarized PMI feedback manner to determine the first PMI.

17. The apparatus according to claim 16, wherein the operations further comprises:

sending second indication information, wherein the second indication information indicates a polarization direction to use to determine the first PMI.

18. The apparatus according to claim 15, wherein $N_g$=1, each precoding vector $w_i$ is a two-dimensional discrete Fourier transform (DFT) vector, and each two-dimensional DFT vector satisfies:

$$\begin{cases} v_{l_i,m_i} = \left[u_{m_i}, u_{m_i} e^{j\frac{2\pi l_i}{O_1 N_1}}, \ldots, u_{m_i} e^{j\frac{2\pi l_i (N_1-1)}{O_1 N_1}}\right]^T \\ u_{m_i} = \left[1, e^{j\frac{2\pi m_i}{O_2 N_2}}, \ldots, e^{j\frac{2\pi m_i (N_2-1)}{O_2 N_2}}\right] \end{cases},$$

wherein $v_{l_i,m_i}$ represents the corresponding two-dimensional DFT vector, $(l_i, m_i)$ respectively represents an index of the corresponding two-dimensional DFT vector in the first dimension and an index of the corresponding two-dimensional DFT vector in the second dimension, $l_i$=0,1, . . . , $O_1N_1$−1, and $m_i$=0,1, . . . , $O_2N_2$−1; $O_1$ represents an oversampling factor in the first dimension; and $O_2$ represents an oversampling factor in the second dimension; and wherein the first PMI is used to determine $(l_i, m_i)$.

19. The apparatus according to claim 15, wherein $N_g$>1, and each precoding vector $w_i$ satisfies:

$w_i=[w_{i,0}; w_{i,1}; \ldots; w_{i,N_g-1}]$, wherein each sub-vector $w_{i,0}$ is the 1st sub-vector in the precoding vector $w_i$, each sub-vector $w_{i,0}$ is a two-dimensional discrete Fourier transform (DFT) vector, and each two-dimensional DFT vector satisfies:

$$\begin{cases} v_{l_i,m_i} = \left[u_{m_i}, u_{m_i} e^{j\frac{2\pi l_i}{O_1 N_1}}, \ldots, u_{m_i} e^{j\frac{2\pi l_i (N_1-1)}{O_1 N_1}}\right]^T \\ u_{m_i} = \left[1, e^{j\frac{2\pi m_i}{O_2 N_2}}, \ldots, e^{j\frac{2\pi m_i (N_2-1)}{O_2 N_2}}\right] \end{cases},$$

wherein $v_{l_i,m_i}$ represents the corresponding two-dimensional DFT vector, $(l_i, m_i)$ respectively represents an index of the corresponding two-dimensional DFT vector in the first dimension and an index of the two-dimensional DFT vector in the second dimension, $l_i$=0,1, . . . , $O_1N_1$−1, and $m_i$=0,1, . . . , $O_2N_2$−1; $O_1$ represents an oversampling factor in the first dimension; and $O_2$ represents an oversampling factor in the second dimension; and the sub-vector $w_{i,g}$ is the $(g+1)^{th}$ sub-vector in the precoding vector $w_i$, and the sub-vector $w_{i,g}$ satisfies:

$w_{i,g}=\alpha_g w_{i,0}$, wherein g=1,2, . . . , $N_g$−1, and $\alpha_g$ is an offset value of the $(g+1)^{th}$ sub-vector $w_{i,g}$ relative to the 1st sub-vector $w_{i,0}$, wherein the first PMI is used to determine $(l_i, m_i)$ and the offset value $\alpha_g$.

20. The apparatus according to claim 15, wherein the first PMI is carried in a first channel state information (CSI) report, the first CSI report does not comprise a second PMI, the second PMI and the first PMI jointly indicate a precoding matrix $W_{dual}$, the precoding matrix $W_{dual}$ comprises R precoding vectors w_(dual,i), w_(dual,i)=$[w_i, \tilde{w}_i]$, and i=0, 1,2, . . . , R−1, wherein the precoding vectors $w_i$ and $\tilde{w}_i$ are column vectors with a length of $N_1\times N_2\times N_g$, each precoding vector $w_i$ represents a precoding vector in a first polarization direction, and the precoding vector $\tilde{w}_i$ represents a precoding vector in a second polarization direction.

* * * * *